US012789981B2

(12) United States Patent
Schuster et al.

(10) Patent No.: US 12,789,981 B2
(45) Date of Patent: Nov. 10, 2026

(54) SWING-ARM PISTON LANDING GEAR SYSTEMS AND METHODS

(71) Applicant: JETZERO, INC., Long Beach, CA (US)

(72) Inventors: Ewald Schuster, Irvine, CA (US); Jennifer Whitlock, Zionsville, IN (US); Joshua B Long, Lake Forest, CA (US); Cristina Donastorg, Irvine, CA (US); Brendan Kennelly, Fullerton, CA (US); Mark A. Page, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/373,690

(22) Filed: Sep. 27, 2023

(65) Prior Publication Data

US 2024/0051659 A1 Feb. 15, 2024

Related U.S. Application Data

(63) Continuation-in-part of application No. 16/730,108, filed on Dec. 30, 2019, now Pat. No. 11,801,932.

(Continued)

(51) Int. Cl.
*B64C 25/14* (2006.01)
*B64C 25/00* (2006.01)

(Continued)

(52) U.S. Cl.
CPC .............. *B64C 25/14* (2013.01); *B64C 25/22* (2013.01); *B64C 25/26* (2013.01); *B64C 2025/008* (2013.01); *B64C 2039/105* (2013.01)

(58) Field of Classification Search
CPC ... B64C 2025/008; B64C 25/14; B64C 25/26; B64C 25/10
See application file for complete search history.

(56) References Cited

U.S. PATENT DOCUMENTS

| | | | |
|---|---|---|---|
| 1,716,439 | A | 6/1929 | Edrington |
| 1,810,244 | A | 6/1931 | Hicks |

(Continued)

FOREIGN PATENT DOCUMENTS

| | | | |
|---|---|---|---|
| FR | 3018501 | A1 | 9/2015 |
| GB | 1593393 | A | 7/1981 |

(Continued)

OTHER PUBLICATIONS

Jenkins, et al., "Tricycle Landing Gear Design—Part 1", Journal of the Aeronautical Sciences, vol. 9, No. 10, pp. 385-396, Aug. 1942. doi:10.2514/8.10912 (Year: 1942).

*Primary Examiner* — Timothy D Collins
*Assistant Examiner* — Terri L Filosi
(74) *Attorney, Agent, or Firm* — Jeffrey Schox

(57) ABSTRACT

Systems and methods for mechanically rotating an aircraft about its center-of-gravity (CG) are disclosed. The system can enable the rear, or main, landing gear to squat, while the nose landing gear raises to generate a positive pitch angle for the aircraft for takeoff or landing. The system can also enable the nose gear and main gear to return to a relatively level fuselage attitude for ground operations. The system can include one or more hydraulically linked hydraulic cylinders to control the overall height of the nose gear and the main gear. Because the hydraulic cylinders are linked, a change on the length of the nose cylinder generates a proportional, and opposite, change in the length of the main cylinder, and vice-versa. A method and control system for monitoring and controlling the relative positions of the nose gear and main gear is also disclosed.

22 Claims, 22 Drawing Sheets

Related U.S. Application Data

(60) Provisional application No. 62/787,092, filed on Dec. 31, 2018.

(51) Int. Cl.

| | |
|---|---|
| ***B64C 25/22*** | (2006.01) |
| ***B64C 25/26*** | (2006.01) |
| ***B64C 39/10*** | (2006.01) |

(56) References Cited

U.S. PATENT DOCUMENTS

| | | | | |
|---|---|---|---|---|
| 1,853,232 | A | 4/1932 | Alfred | |
| 2,138,326 | A | 11/1938 | Robert | |
| 2,147,536 | A | 2/1939 | Lucien | |
| 2,368,855 | A | 2/1945 | Lucien | |
| 2,556,964 | A | 6/1951 | Giroud | |
| 2,630,989 | A | 3/1953 | Sikorsky | |
| 3,826,450 | A | 7/1974 | Currey et al. | |
| 4,228,975 | A | 10/1980 | Sealey | |
| 4,524,929 | A | 6/1985 | Gebhard | |
| 4,746,086 | A * | 5/1988 | Happ | B64C 25/001 244/104 R |
| 5,060,886 | A | 10/1991 | Davis et al. | |
| 5,337,976 | A | 8/1994 | Derrien | |
| 5,548,517 | A | 8/1996 | Nance | |
| 5,823,468 | A | 10/1998 | Bothe | |
| 6,032,090 | A | 2/2000 | von Bose | |
| 6,626,398 | B1 | 9/2003 | Cox et al. | |
| 6,772,977 | B2 | 8/2004 | Dees et al. | |
| 6,854,689 | B1 | 2/2005 | Lindahl et al. | |
| 7,143,975 | B2 | 12/2006 | Udall | |
| 7,249,736 | B2 | 7/2007 | Clark | |
| 7,427,049 | B2 | 9/2008 | Kennedy et al. | |
| 7,618,005 | B1 | 11/2009 | Tafoya | |
| 8,056,852 | B1 | 11/2011 | Dizdarevic et al. | |
| 8,070,094 | B2 | 12/2011 | Collins | |
| 8,186,620 | B2 | 5/2012 | Luce et al. | |
| 8,459,590 | B2 | 6/2013 | Devlieg | |
| 8,886,402 | B1 | 11/2014 | Lou | |
| 9,499,256 | B2 | 11/2016 | Nakashima et al. | |
| 9,957,035 | B2 | 5/2018 | Valasek et al. | |
| 10,150,558 | B2 | 12/2018 | Page | |
| 10,640,212 | B1 | 5/2020 | Dizdarevic et al. | |
| 10,857,906 | B2 | 12/2020 | Jameson et al. | |
| 11,136,114 | B2 | 10/2021 | Rowlands et al. | |
| 11,186,375 | B2 | 11/2021 | Wolgast | |
| 11,433,991 | B2 | 9/2022 | Whitlock et al. | |
| 11,713,110 | B2 | 8/2023 | Rawdon | |
| 11,801,932 | B2 | 10/2023 | Schuster et al. | |
| 12,391,371 | B2 | 8/2025 | Page | |
| 2005/0218263 | A1 | 10/2005 | Udall | |
| 2007/0057117 | A1 | 3/2007 | Payen et al. | |
| 2007/0145185 | A1 | 6/2007 | Clark | |
| 2009/0120748 | A1 | 5/2009 | Love | |
| 2009/0187293 | A1 | 7/2009 | Trotter et al. | |
| 2009/0321560 | A1 | 12/2009 | Luce et al. | |
| 2010/0116931 | A1 | 5/2010 | Wilby | |
| 2013/0099053 | A1 | 4/2013 | Barmichev et al. | |
| 2018/0001999 | A1 | 1/2018 | Page | |
| 2018/0050791 | A1 * | 2/2018 | Robinson | B64C 25/54 |
| 2018/0244373 | A1 | 8/2018 | Mellor et al. | |
| 2018/0346103 | A1 | 12/2018 | Thompson | |
| 2019/0389581 | A1 | 12/2019 | Chittick et al. | |
| 2020/0207463 | A1 * | 7/2020 | Schuster | B64C 25/40 |
| 2020/0333805 | A1 | 10/2020 | English et al. | |
| 2020/0346743 | A1 * | 11/2020 | Bernard | B64C 25/18 |
| 2021/0024203 | A1 | 1/2021 | Chappell et al. | |
| 2021/0031903 | A1 | 2/2021 | Murray et al. | |
| 2021/0047029 | A1 | 2/2021 | Stanney et al. | |
| 2021/0354831 | A1 | 11/2021 | Clark et al. | |
| 2022/0194565 | A1 | 6/2022 | Wilson | |
| 2022/0348318 | A1 | 11/2022 | Howell et al. | |
| 2022/0355917 | A1 | 11/2022 | Venn et al. | |
| 2024/0025536 | A1 | 1/2024 | Page | |
| 2024/0109649 | A1 | 4/2024 | Page | |

FOREIGN PATENT DOCUMENTS

| | | | |
|---|---|---|---|
| GB | 2410728 | A | 8/2005 |
| WO | 2008063685 | A2 | 5/2008 |
| WO | 2015158894 | A1 | 10/2015 |

* cited by examiner

--Prior Art--

1

SWING-ARM PISTON LANDING GEAR SYSTEMS AND METHODS

CROSS-REFERENCE TO RELATED APPLICATIONS

This application is a continuation-in-part of Non-provisional Application Ser. No. 16/730,108 filed on Dec. 30, 2019, and entitled "SWING-ARM PIVOT PISTON LANDING GEAR SYSTEMS AND METHODS," which claims the benefit of priority of U.S. Provisional Patent Application Ser. No. 62/787,092 filed on Dec. 31, 2018, which entities are all incorporated herein by reference.

FIELD OF THE INVENTION

The present invention generally relates to the field of aircraft. In particular, the present invention is directed to a swing-arm pivot piston landing gear systems and methods.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially larger percentage of the available volume of the fuselage to be utilized.

While convenient from a packaging standpoint, the tube and wing configuration is not particularly efficient. This is because the fuselage provides little or no lift, yet, introduces substantial drag. Thus, the wing must provide essentially all of the lift required for the aircraft to fly. This configuration requires a wing that is larger, thicker, and/or more cambered than would otherwise be required for a configuration where the fuselage provided a larger percentage of the required lift. This results in a wing with higher lift but proportionately higher drag. Thus, the engines must provide enough thrust to overcome the drag from both the fuselage and the (now higher drag) wing.

In a blended wing configuration, on the other hand, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

Due to their unconventional shape, however, blended wing aircraft can present some challenges with regard to packaging. In other words, because the shape of the fuselage is more irregular than a conventional tube-shaped fuselage, providing storage for cargo, equipment, passengers, and other components can be challenging. In particular, as shown in FIGS. 1A and 1B, finding a suitable place to stow the retracted landing gear 105 can be challenging. In general, it is desirable to place the main, or rear, landing gear 105*a* fairly close to the center of gravity, CG, of the aircraft. This placement reduces the aerodynamic forces that must be generated by the flight control surfaces 120 (e.g., elevons 110 and/or inboard elevons 115) to rotate the aircraft on take-off. In other words, if the main landing gear 105*a* is placed too far from the CG, the flight surfaces cannot overcome the weight of the aircraft acting on such a large lever arm, LMG, for the purposes of takeoff rotation.

As shown in FIG. 1A, therefore, from a weights and balances standpoint, it is desirable to place the main gear 105*a* as close to the CG as possible. In addition, the maximum width, or track, of the landing gear is limited by regulation to ensure landing gear/runway compatibility. In a blended wing design, however, this unfortunately places the landing gear in the middle of the desired passenger compartment (on a single level aircraft) or in the middle of the cargo compartment (on a multi-level aircraft). This reduces seating and/or cargo capacity and makes packaging, interior aesthetics, and utility more difficult, among other things.

As shown in FIGS. 2A and 2B, one solution is to simply move the main landing gear 105*a* rearward out of the passenger compartment 125. Unfortunately, this places the main landing gear 105*a* at a substantial distance from the CG. This, in turn, creates a large lever arm LMG, between the CG and the contact patch of the main landing gear 105*a*. In this configuration, the elevons 110 and/or inboard elevons 115 are likely unable to generate enough negative lift at the rear of the wing to rotate the plane for takeoff. Thus, one problem—clearing the passenger and/or cargo compartment—has been traded for another—increasing takeoff distance or not being able to take off at all. Of the two, taking off is clearly more important in an aircraft.

What is needed, therefore, is a system and method for rotating the aircraft for takeoff using something other than the aerodynamic control surfaces. The system should be simple and robust and provide pilots with a similar tactile experience as a conventional configuration. It is to such systems and methods to which examples of the present disclosure are primarily directed.

SUMMARY OF THE DISCLOSURE

Examples of the present disclosure relate to a tilting, or rotating, landing gear system. The system enables an aircraft to be rotated about its center-of-gravity (CG) regardless of the placement of the landing gear. In this configuration, the landing gear of the aircraft can be placed farther from the CG than would otherwise be possible. The system provides a balanced hydraulic or mechanical system to reduce the effort required to rotate the aircraft to assume the desired pitch angle for various procedures, such as takeoff, landing, ground operations, and other operational regimes. The system reduces the aerodynamic forces required by balancing mechanical and hydraulic forces about the CG and can also include mechanical or hydraulic means in addition to the aerodynamic forces provided by the aerodynamic surfaces of the aircraft (e.g., ailerons, elevons, and/or flaps).

In some examples, the system can be a passive hydraulic system with hydraulic, pneumatic, or hydro-pneumatic cylinders mounted to the nose and main gears. The cylinders can be hydraulically connected such that an upward movement in a nose cylinder causes a proportional movement in two or more main cylinders, and vice versa. The cylinders can be balanced such that the hydraulic and mechanical forces (e.g., leverage) are balanced about the CG, such that very little aerodynamic force is required to rotate the aircraft for takeoff In some examples, to achieve a positive pitch angle for takeoff, for example, a hydraulic valve between the main cylinder and nose cylinder can be opened. The cylinders can be sized such that, when the valve is in the open position with the aircraft on the ground, hydraulic fluid flows from the main cylinder(s) to the nose cylinder(s) causing the nose gear to extend and the main gear to squat. The relative position of the main gear(s) and the nose gear(s) can be locked by closing the hydraulic valve (i.e., when the desired pitch angle has been achieved). The system can include a pitch angle for landing, takeoff, ground operations, or maintenance, among other positions.

In flight, the valve can be opened and the weight of the main gear, for example, can cause the fluid to move from the nose cylinder back to the main cylinder. This extends the main gear and lowers the nose gear to a ground position, stowed position, or landing position, among other positions. During ground operations, the cylinders can be locked such that the aircraft is substantially level to the ground (i.e., the aircraft has a substantially zero pitch angle). In some examples, the system can also include a hydraulic pump to move hydraulic fluid from the nose cylinder to the main cylinder, and vice-versa.

Examples of the present disclosure can also include a control system and a method for mechanically rotating the aircraft during various procedures, such as take-off or landing. The control system can lock the aircraft in a substantially level attitude when on the ground (e.g., at a substantially zero pitch angle). When the aircraft reaches the appropriate speed and the pilot is pulling back on the control stick with at least a minimum force, the control system can open the hydraulic valve enabling the main gear to squat and the nose gear to extend to the desired pitch angle. This could include, for example, a rotation speed, or V1, for takeoff, for example, or a reference speed, VREF, for landing. The control system can close the hydraulic valve to lock the landing gear at the desired pitch angle. After takeoff, when the control system determines that the landing gear is unloaded—and the aircraft is airborne—the control system can close the valve to lock the landing gear in the position necessary for strut retraction. After landing, when the aircraft has sufficiently reduced its speed, the control system can close valve to lock the plane in a substantially level, ground position.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
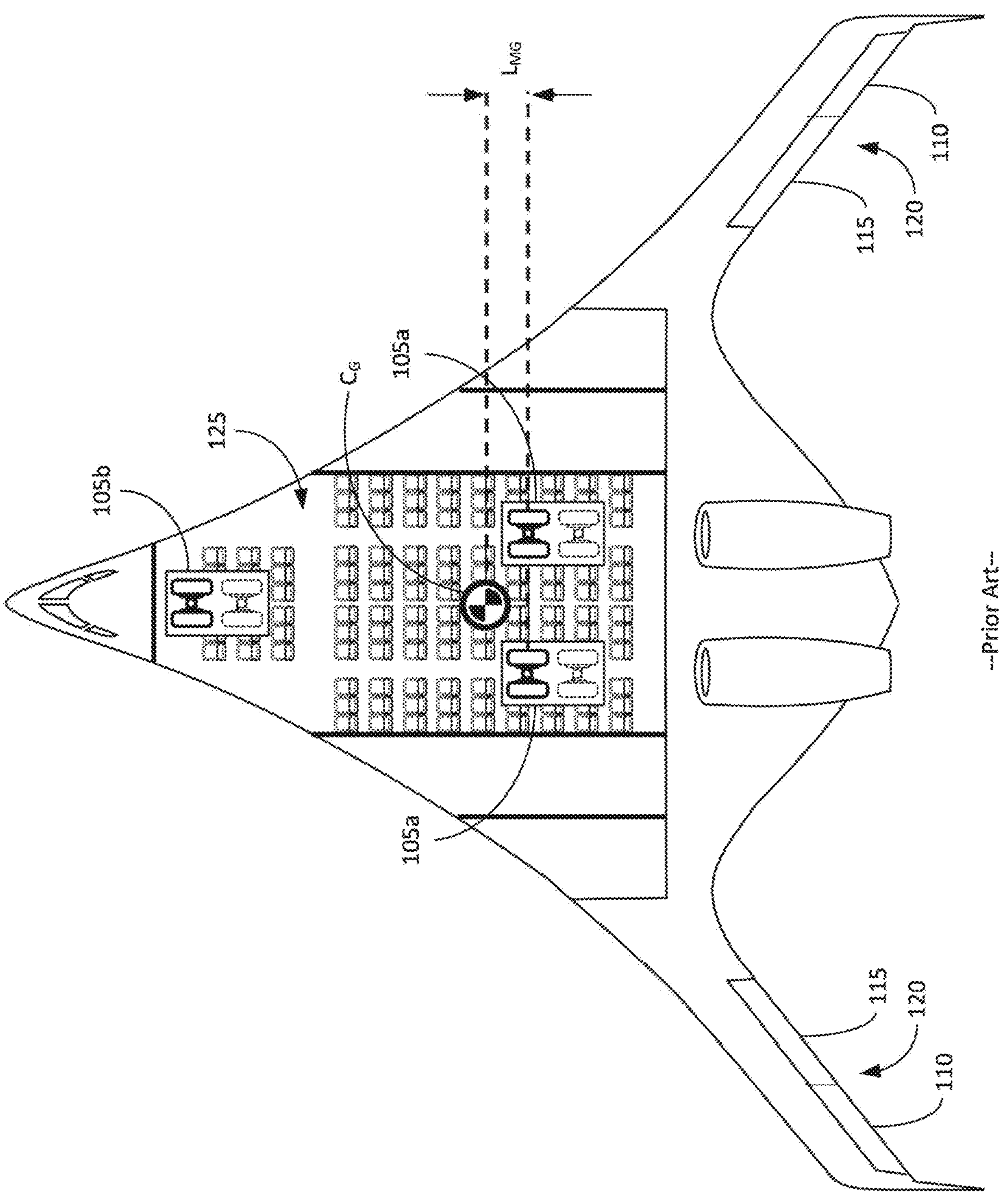
FIGS. 1A and 1B are plan and side views, respectively, depicting a blended-wing aircraft with the landing gear in a convention location near the center-of-gravity (CG) and inside the passenger or cargo compartment.
Figure 1B:
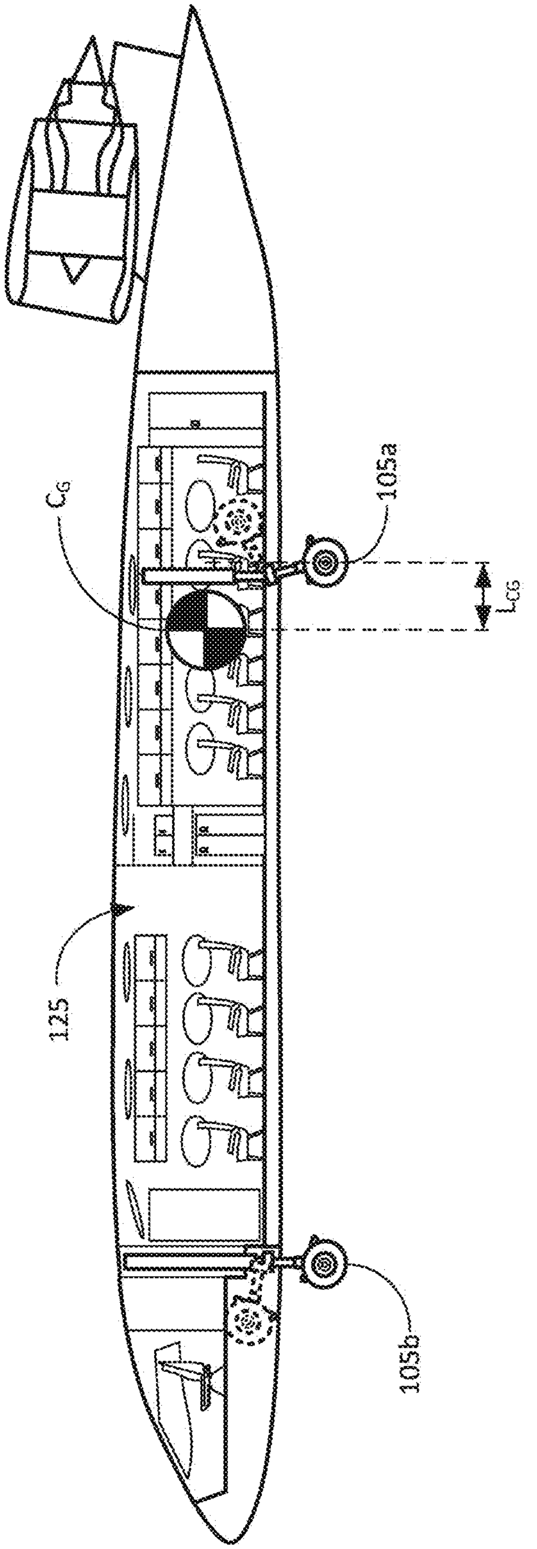

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Examples of the present disclosure related generally to aircraft landing gear, and specifically aircraft landing gear that enables the aircraft to be tilted, or rotated, for takeoff or landing, for example, with very little force from the aircraft's aerodynamic control surfaces. In some examples, the system can include one or more interconnected hydraulic cylinders that enable the aircraft landing struts to extend in the front and collapse in the back to provide the desired takeoff or landing attitude. In some examples, the hydraulic cylinders can be sized and shaped to provide the desired first configuration on the ground and then return to the default, second configuration after takeoff. In other embodiments, the hydraulic cylinders can be linked to levers sized and shaped to provide the desired effect.

To simplify and clarify explanation, the disclosure is described herein as a system and method for use with a blended wing aircraft. One skilled in the art will recognize, however, that the disclosure is not so limited. While the system is useful in conjunction with blended wing aircraft due to some unique packaging constraints, it should be understood that the system can just as easily be used for conventional tube and wing, delta wing, and other aircraft configurations. The system can also be used as a safety measure to ensure takeoff or landing rotation in a plane that is, for example, malfunctioning or inadvertently misloaded. In addition, the system could also be used for ground-based equipment, such as loaders, semi-trucks, and other equipment that require tilting or rotation during use.

The manufacturing methods, materials, and systems described hereinafter as making up the various elements of the present disclosure are intended to be illustrative and not restrictive. Many suitable materials, struts, systems, and configurations that would perform the same or a similar function as the systems described herein are intended to be embraced within the scope of the disclosure. Such other systems and methods not described herein can include, but are not limited to, vehicles, systems, networks, materials, and technologies that are developed after the time of the development of the disclosure.

As discussed above, it is often convenient to place the main landing gear toward the rear of the aircraft for packaging purposes. This tends to move the landing gear behind the passenger and/or cargo compartments enabling more, or more convenient, passenger and cargo compartments. Unfortunately, this also tends to move the landing gear away from the CG of the aircraft. This, in turn, increases the amount of force required to rotate the aircraft for takeoff or landing. This rearward landing gear configuration may require five times the force or more, to rotate the aircraft than can be produced by the aerodynamic surfaces of the wing at takeoff speeds. What is needed, therefore, is a system and method that assists, or replaces, the forces provided by the aerodynamic surfaces with mechanical forces of sufficient force.

Figures 3A, 3B:
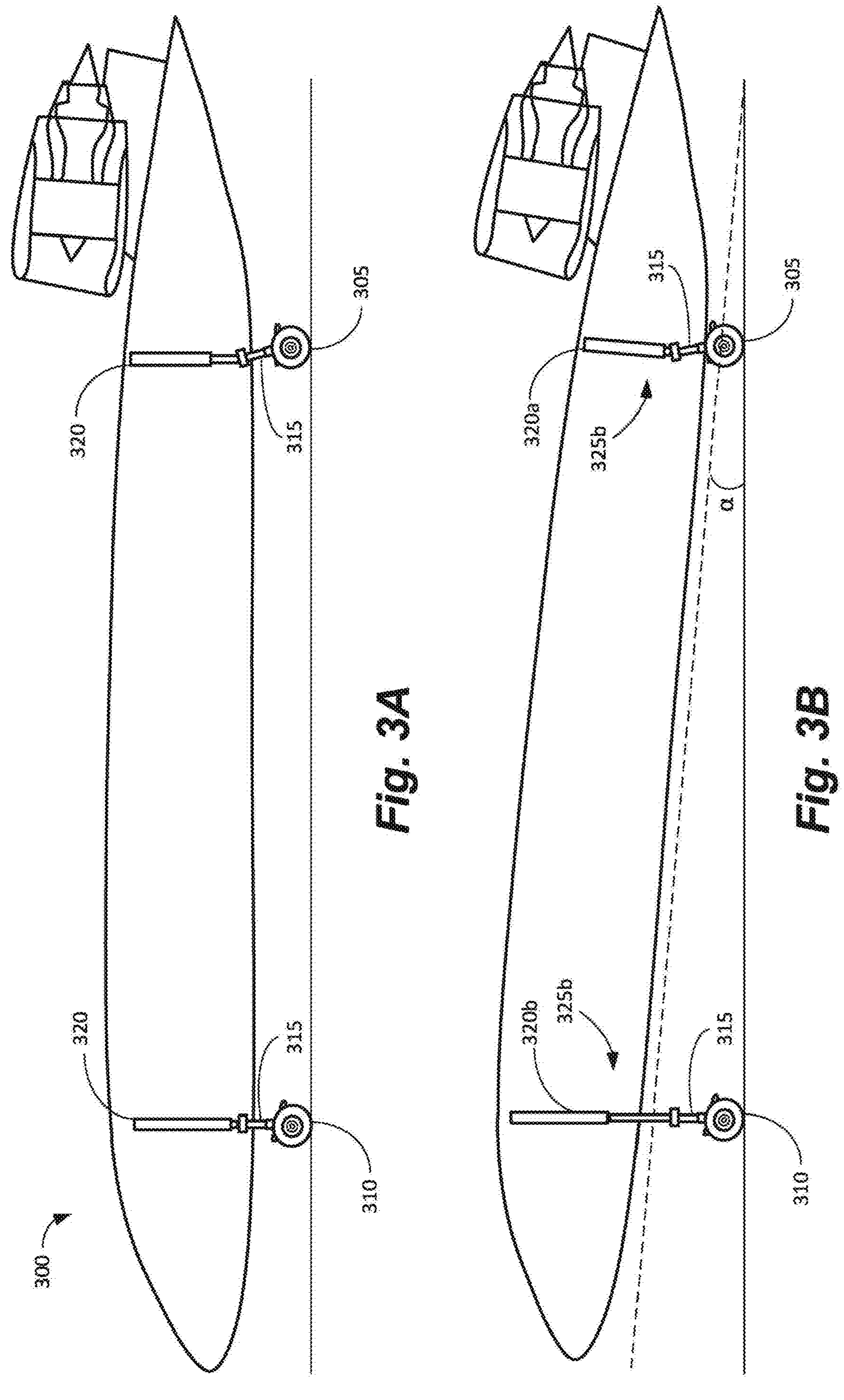
FIGS. 3A and 3B are side views depicting a blended-wing aircraft with the main landing gear in a rearward location with a tilting landing gear system in the level, or ground position (FIG. 3A) and in the pitch angle—e.g., takeoff or landing—position (FIG. 3B), in accordance with some examples of the present disclosure.

To this end, as shown in FIGS. 3A and 3B, examples of the present disclosure can comprise a system 300 comprising a main gear 305 that can squat and/or a nose gear 310 that can extend to mechanically provide the desired pitch angle or a for takeoff and/or landing. In some examples, the system 300 can comprise two or more main gears 305*a* and one or more nose gear 310. In some examples, the system 300 can comprise standard oleo struts 315 (e.g., air-oil pneumatic struts) mounted on one or more actuators 320. In some examples, as discussed below, the actuators 320 can be cylinders that are hydraulically or pneumatically linked, such that when one hydraulic cylinder 320 collapses the other hydraulic cylinder 320 extends, and vice-versa. In other examples, the hydraulic cylinder 320 can be independently controlled to work in concert. In a preferred embodiment, the hydraulic cylinder 320 can comprise hydraulic cylinders that are also hydraulically linked.

As shown in FIG. 3A, therefore, in the level, or ground, configuration, the aircraft can be substantially level. In this configuration, the hydraulic cylinders 320 can be positioned such that the oleo struts 315 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, such that when the aircraft is on the ground, the nose hydraulic cylinder 320*b* is fully retracted and the main hydraulic cylinder 320*a* is fully extended. As discussed below, in some examples, for safety purposes, the hydraulic cylinders 320 can be locked in the level position anytime the aircraft is on the ground and below a predetermined speed unless otherwise overridden—e.g., for maintenance purposes.

As shown in FIG. 3B, however, to enable the aircraft to rotate for takeoff or landing, the main hydraulic cylinder 320*a* can collapse and the nose hydraulic cylinder 320*b* can extend to provide the desired pitch angle. In this configuration, as with conventional landing gear, the oleo struts 315 react to impacts and undulations on the ground, but these motions are measured in inches, quite small relative to the stroke needed for the tilting system. As the hydraulic cylinders collapse and extend, however, the overall height of the strut/cylinder assembly 325 changes.

Thus, as the main hydraulic cylinder(s) 320*a* (i.e., two or more main hydraulic cylinder 320*a* for the two or more main gears 305*a*) retracts, the rear strut/cylinder assembly 325*a* squats. Conversely, as the nose hydraulic cylinder 320*b* (i.e., the cylinder for the nose gear 310) extends, the nose strut/cylinder assembly 325*b* extends. This has the effect of lowering the rear of the aircraft and raising the front of the aircraft to simulate takeoff rotation and/or landing flare.

Notably, however, this attitude is achieved with the landing gear 305, 310 still on the ground. In addition, as discussed below, the location and size of the hydraulic cylinders 320 can be such that they are essentially in equilibrium about the CG. In this manner, the system 300 can rotate the aircraft with very little force provided by the aerodynamic surfaces of the wing. This (1) overcomes the aforementioned issues related to overcoming a large LMG and (2) does so with the wing in a more aerodynamically efficient configuration. Because rotation requires much less negative lift and thus, deflection of the elevons 110 (or elevons in a tailless configuration) and/or inboard elevons 115, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 305 has cleared the tarmac, the location of the main gear 305 is no longer relevant from an aerodynamic standpoint. Once aloft, the location of the main gear 305 is relevant only from a weights and balances standpoint, which can be accounted for with fuel, cargo, and/or passenger weight, among other things. At or before liftoff, therefore, the flight control surfaces 120 can be positioned to provide the necessary aerodynamic forces to maintain the desired pitch angle for climb out.

Of course, while shown and described with hydraulic cylinders 320, pneumatic cylinders and other types of linear or rotary actuators could be used. The system 300 could utilize linear actuators, for example, electrically driven by the aircraft's electrical system. The system 300 could also utilize servo motors, for example, with a rack and pinion or pushrod actuation to the landing gear 305, 310. Indeed, rather than using separate hydraulic cylinders 320, as shown, the system 300 could use lengthened versions of the existing oleo struts 315 interconnected in a similar manner. This configuration might reduce weight and complexity if sufficient space is available in the airplane for the lengthy struts 315 and the volume swept by the rotation angle needed for retraction. Thus, any type of mechanism that can enable the main gear 305 to squat and/or the nose gear 310 to lift can provide the necessary pitch angle.

Figure 4A:
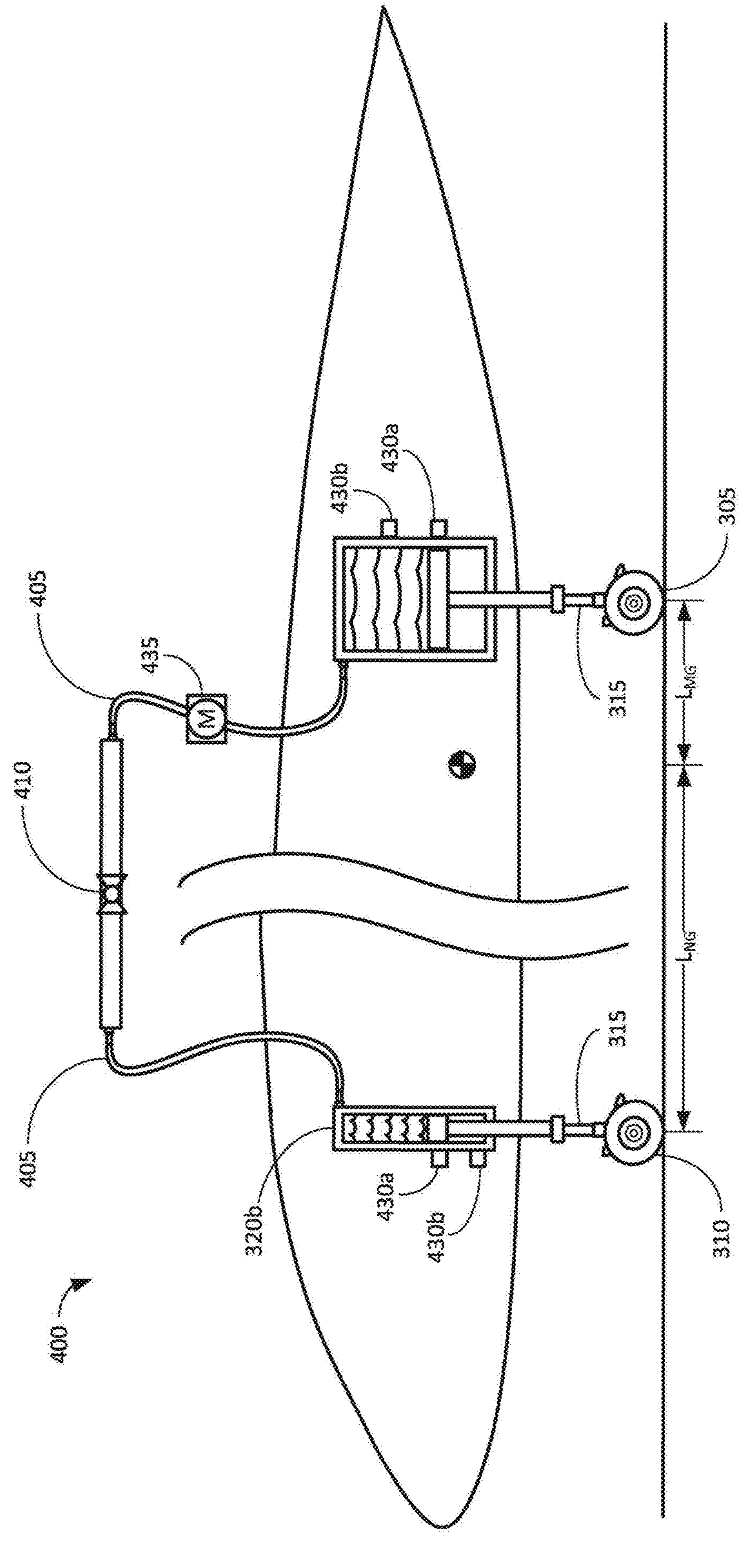
FIGS. 4A and 4B are side views depicting a blended-wing aircraft with a direct- hydraulic tilting landing gear system in the level, or ground position (FIG. 4A) and in the pitch angle position (FIG. 4B), in accordance with some examples of the present disclosure.
Figure 4B:
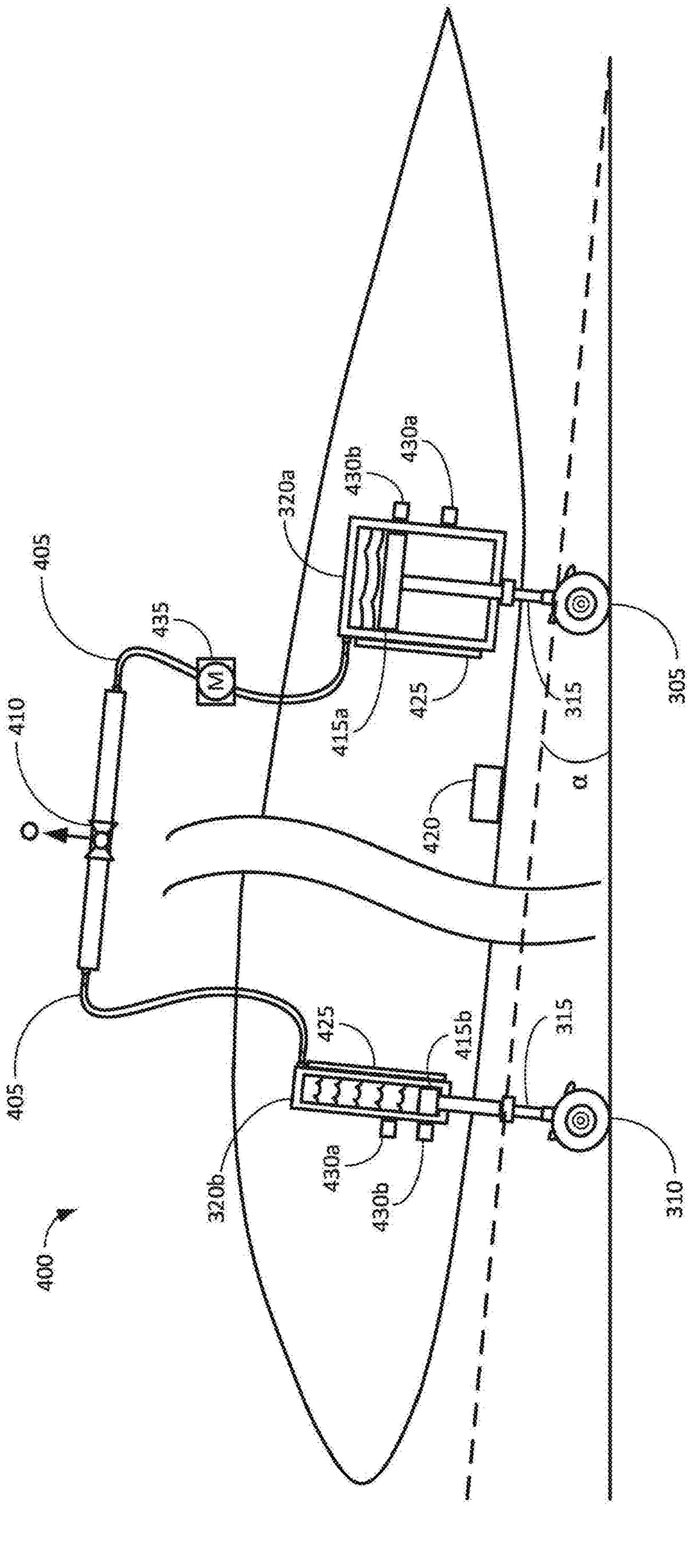

As shown in FIGS. 4A and 4B, in some examples, the system 400 can be essentially passive. In this configuration, the hydraulic cylinders 320 can be linked and can be sized and shaped such that they are essentially hydraulically neutral about the CG. In other words, the total area of the piston(s) for the nose hydraulic cylinder 320*b* and the total area of the piston(s) for the main hydraulic cylinder 320*a* combined with their relative distances from the CG can be calculated to balance the aircraft about the CG.

As shown, in some examples, the main hydraulic cylinder 320*a* can have a larger total piston surface area, $A_{MG}$, (i.e., the combined, or total, piston surface area of the main hydraulic cylinders 320*a*, if there are multiple main gears 305*a*) than the total piston surface area, $A_{NG}$, of the nose hydraulic cylinder 320*b*. In the configuration, the distance, $L_{NG}$, from the nose gear 310 to the CG can be larger than the distance, $L_{MG}$, from the main gear 305 to the CG to produce hydro-mechanical equilibrium. Thus, in Equation 1:

$$A_{NG} = \frac{A_{MG}}{L_{NG}/L_{MG}}$$

So, for example, if $L_{NG}=3\times L_{MG}$, then the $$A_{NG} = \frac{1}{3}A_{MG}$$

(from 1, $A_{NG}=A_{NG}/3$).

The hydraulic cylinders 320 can also be linked with a suitably sized hydraulic pipe 405 (e.g., a pipe or hose).

This system allows very small force to rotate the aircraft about its CG despite the placement of the landing gear 305, 310 farther from the CG. In other words, by balancing the hydraulic forces between the nose hydraulic cylinder(s) 320*b* and the main hydraulic cylinder(s) 320*a*, a virtual pivot about the CG is created. Thus, a small downward force at the rear of the wing from the flight control surfaces 120 can cause the aircraft to rotate for takeoff Similarly, a small braking force from the aircraft's brakes can cause the aircraft to de-rotate from the landing position to the ground position, for example.

In some examples, it may be desirable to include a hydraulic valve 410 between the hydraulic cylinders 320. In this manner, the hydraulic cylinders 320 can be locked in a particular position. The hydraulic valve 410 can be, for example, a ball valve, gate valve, or throttle valve.

Figure 13:
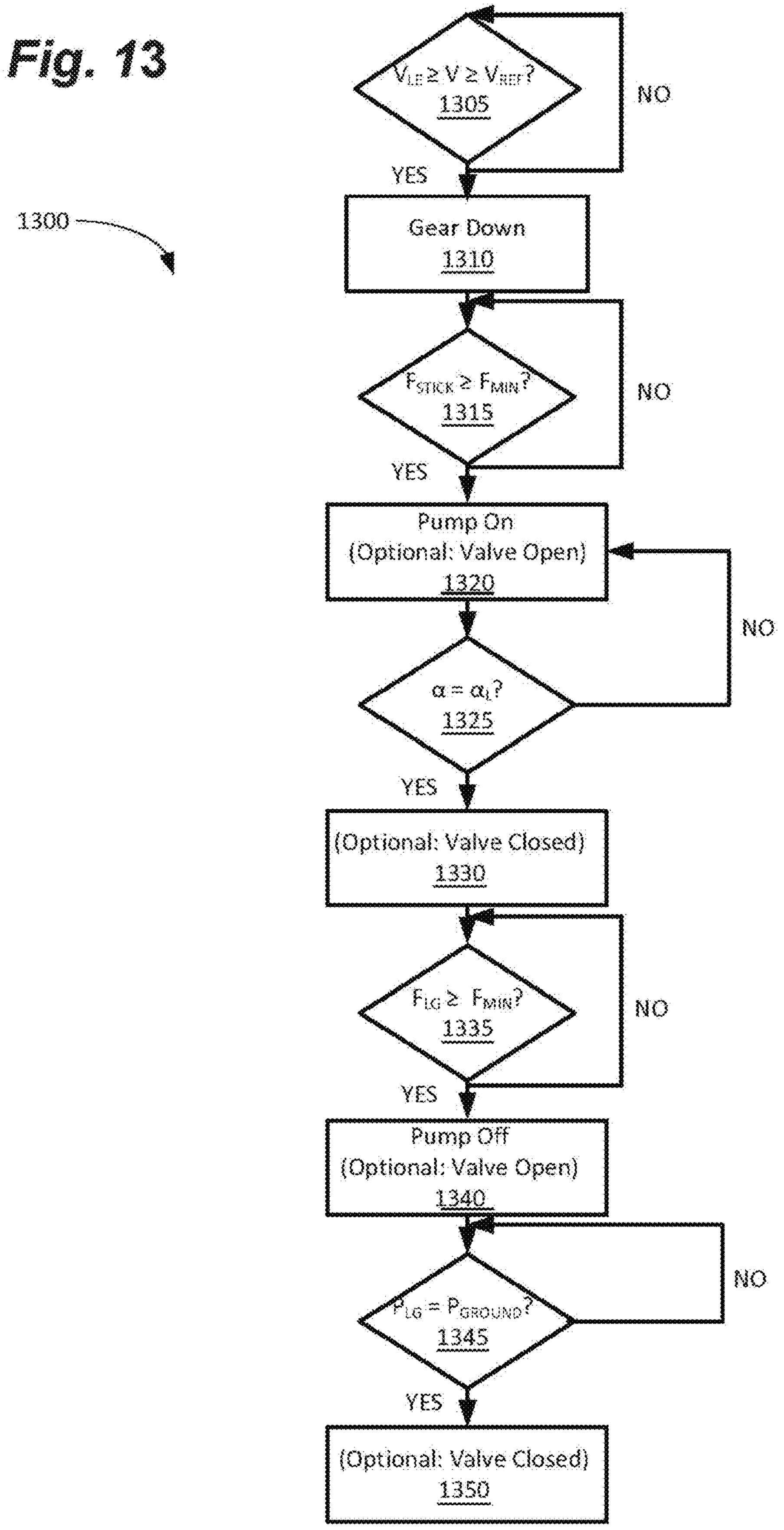
FIG. 13 is a flowchart depicting a method for controlling the rotating landing gear system on landing, in accordance with some examples of the present disclosure.

In the level, or ground position, therefore, both hydraulic cylinders 320 can be positioned such that the oleo struts 315 are in substantially the same position and the aircraft fuselage is substantially level. In some examples, the aircraft may have a very slightly nose heavy configuration. This can be achieved passively with the difference in deadweight of the landing gear, for example, or by using a small pump 435 to provide a slight bias of fluid to the main hydraulic cylinder 320*a*. When the hydraulic valve 410 is open (or there is no hydraulic valve), therefore, the nose hydraulic cylinder 320*b* can retract and the main hydraulic cylinder 320*a* can extend. In some examples, the aircraft can be in the ground position when the nose hydraulic cylinder 320*b* is completely retracted, or "bottomed out." In some examples, the hydraulic valve 410 may be connected to other components of various nose gears, such as the upper master link and/or the pivot-piston of FIG. 13 or the pivot-piston of FIG. 14.

As shown in FIG. 4B, to achieve the desired pitch angle, the nose hydraulic cylinder 320*b* can be extended and the main hydraulic cylinder 320*a* can be retracted. This can be achieved in a number of ways. Since the system 400 is balanced about the CG, for example, a small downward force from the flight control surfaces 120 can cause the aircraft to rotate about the CG to the pitch angle position.

If a hydraulic valve 410 is included, the hydraulic valve 410 can first be placed in the open position. Because the aircraft is in equilibrium, however, opening the hydraulic valve 410 does not, in itself, create any rotation. As before, the rotation can be provided by small forces provided by the flight control surfaces 120. In some examples, the aforementioned pump 435 can be reversed to cause fluid to flow from the main hydraulic cylinder 320*a* to the nose hydraulic cylinder 320*b*. This, in turn, causes the main gear 305 to squat and the nose landing gear 130 to extend creating the desired pitch angle. In any configuration (i.e., with or without a hydraulic valve 410 or a pump 435), the amount of energy required to cause the rotation is significantly smaller because the aircraft is essentially balanced about the CG.

As discussed below, in some examples, the system 400 can include a control system to control the position of the hydraulic cylinders. In some examples, the system 400 can comprise one or more sensors to detect the pitch angle. In some examples, the system 400 can include a tilt sensor 420 disposed on the aircraft to detect the pitch angle. In some examples, the tilt sensor 420 can comprise the attitude sensor included in the aircraft's exiting avionics package. In other examples, the tilt sensor 420 can comprise a separate gyro, accelerometer, or similar sensor to detect the pitch angle. In other examples, the system 400 can include one or more position sensors 425 located on the hydraulic cylinders 320. Based on the position of the hydraulic cylinders 320 and the geometry of the system, the pitch angle can be calculated.

In still other examples, the system 400 can include one or more switches 430 located on the hydraulic cylinders 320. In this configuration, the system 400 can simply comprise two or more positions for various flight situations. The system 400 can include one switch 430*a* for each cylinder in the ground position (FIG. 4A), for example, and one switch 430*b* on each cylinder for the takeoff position (FIG. 4B). The system 400 can also comprise additional switches for additional positions (e.g., landing, heavy payload, etc.).

In some examples, the system 400 can be completely passive. In other words, in some examples, the system 400 can move from the ground position (FIG. 4A) to the takeoff position (FIG. 4B) based solely on the small aerodynamic force provided by the flight control surfaces 120. Similarly, after takeoff, the system 400 can move back to the ground position, for example, because the total weight of the main gear 305 is generally significantly heavier than the total weight of the nose gear 310. After takeoff, therefore, the hydraulic valve 410 can remain open (or be reopened) to enable the total weight of the main gear 305 to extend the main hydraulic cylinder 320*a* and compress the nose hydraulic cylinder 320*b* back to the level position. In other examples, as discussed below, hydraulic pumps, motors, or other power assist can be used.

As mentioned, the system 400 can also comprise a hydraulic motor or pump 435. The pump 435 can be used to actively reposition the landing gear 305, 310 despite loading. In other words, in some examples, it may be desirable to raise the nose gear 310 despite the fact that the aircraft is in a nose heavy configuration. In this configuration, opening the hydraulic valve 410 may cause the nose hydraulic cylinder 320*b* to collapse. In this case, the pump 435 can be activated to provide the desired forward pressure. In some examples, the pump 435 can be reversible, enabling it to pump fluid in either direction to affect rotation in either direction (e.g., nose up/mains down and nose down/mains up). In some examples, the pump 435 can be activated only when the system 400 determines that the landing gear 305, 310 is not moving in the desired direction.

In addition to providing equilibrium about the CG, the different relative sizing of the hydraulic cylinders 320 also cause a proportionally different stroke, S, for each of the cylinders. This relationship is given in Equation 2:

$$\frac{L_{NG}}{L_{MG}} = \frac{S_{NG}}{S_{MG}}$$

Figure 5A:
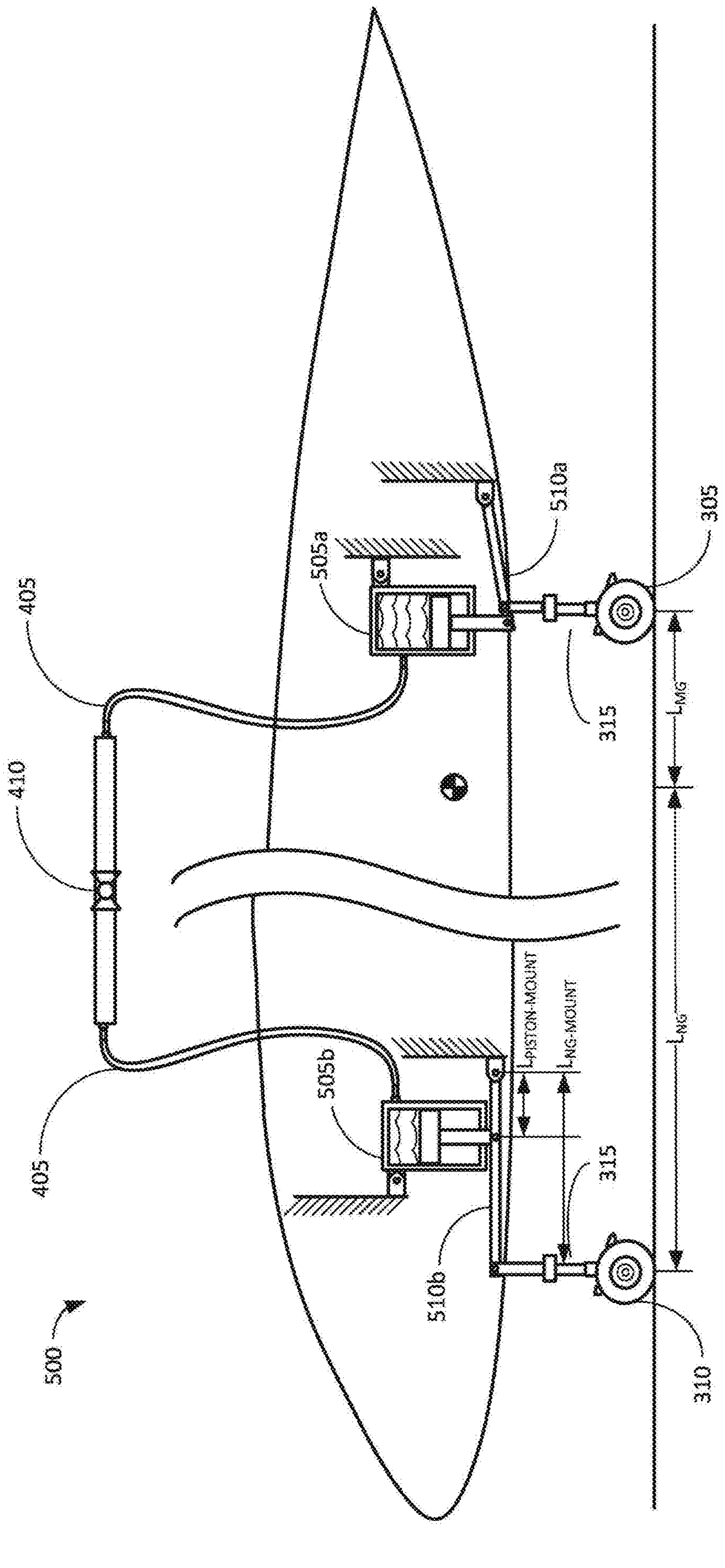
FIGS. 5A and 5B are side views depicting a blended-wing aircraft with a lever- actuated tilting landing gear system in the level, or ground position (FIG. 5A) and in the pitch angle position (FIG. 5B), in accordance with some examples of the present disclosure.
Figure 5B:
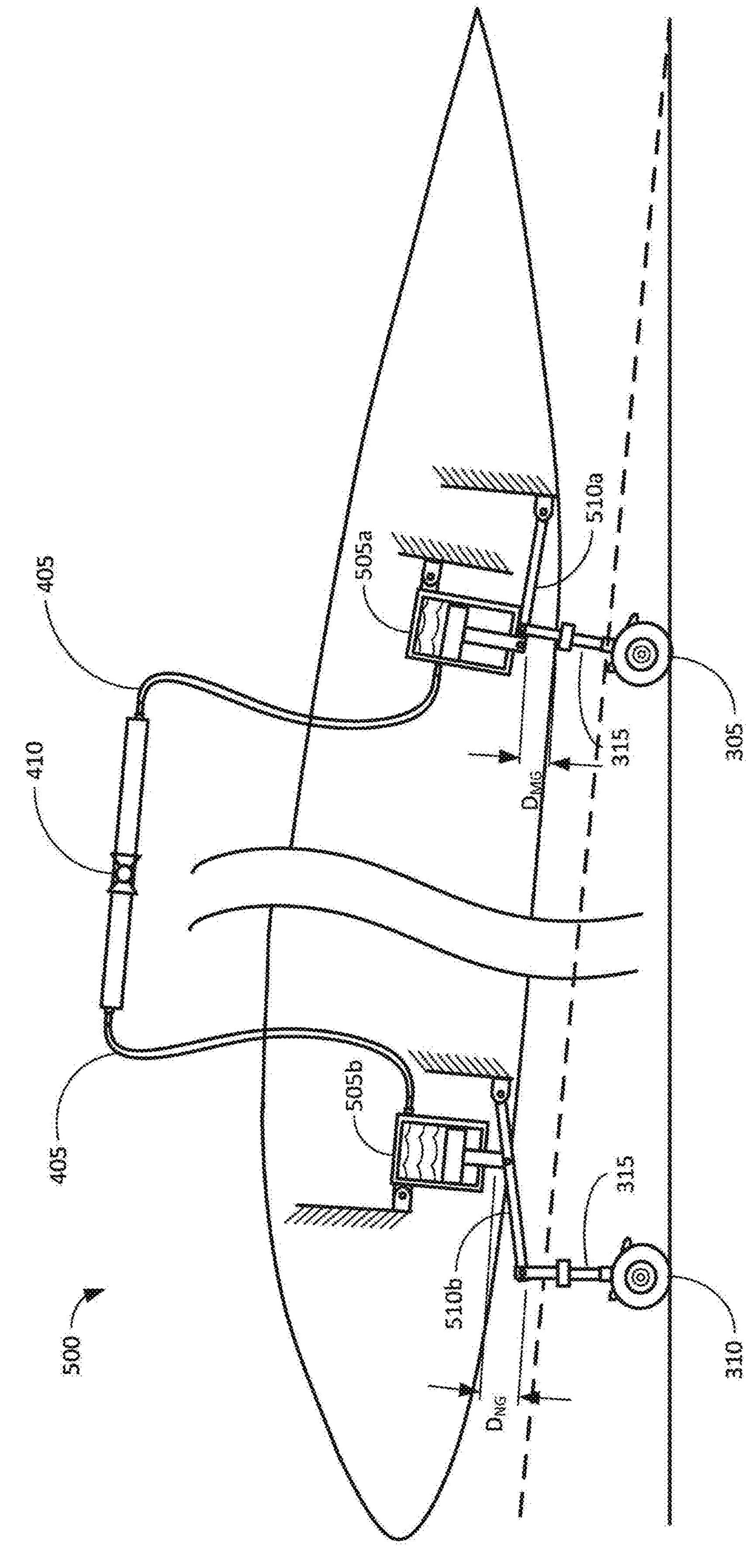

In other examples, as shown in FIGS. 5A and 5B, the hydraulic cylinders 505 can be augmented with levers 510 to provide the desired effect. In other words, in some examples, as shown in FIGS. 5A and 5B, the levers 510 can be used to increase the travel of the nose gear 310 or main gear 305 to enable a smaller (shorter) hydraulic cylinder 505 to be used. Thus, while the main gear 305 may be substantially in line with the rear hydraulic cylinder 505*a*, the nose gear 310 may be offset from the front hydraulic cylinder 505*b* with a nose gear lever 510*b*. In this manner, a relatively small movement of the front hydraulic cylinder 505*b* results in a larger movement of the nose gear 310. Thus, a hydraulic cylinder 505 with a shorter stroke can be used, if desired, for packaging, weight, or other reasons.

In some examples, the mechanical advantage/disadvantage of the levers 510 can also be used to adjust the equilibrium between the front hydraulic cylinder 505*b* and rear hydraulic cylinder(s) 505*a*. As shown in FIG. 5A, the rear hydraulic cylinder 505*a* acts substantially directly on the main gear 305, while the front hydraulic cylinder 505*b* acts on the nose gear 310 via the nose gear lever 510*b* at a distance $L_{NG}$. In this configuration, the nose gear 310 travels farther than the main gear 305 for a given hydraulic cylinder 505 stroke, but also is acted upon with less force. This can serve to distribute the forces appropriately based on the fact that the nose gear 310 generally carries less weight than the main gear 305.

This can also enable the same size hydraulic cylinder 505 to be used for both the nose gear 310 and the main gear 305. Because the rear hydraulic cylinder 505*a* acts substantially directly on the main gear 305, while the front hydraulic cylinder 505*b* acts via a lever arm, $L_{NG\text{-}MOUNT}$/$L_{PISTON\text{-}MOUNT}$, the same size hydraulic cylinder 505 can be used to provide hydraulic equilibrium. In other words, the mechanical advantage provided by the distance from the nose gear to the CG, LNG, is offset by the mechanical disadvantage of the nose gear lever 510*b*. This relationship is given in Equation 3:

$$A_{NG} = A_{MG}$$

$$\frac{L_{NG\text{-}MOUNT}}{L_{PISTON\text{-}MOUNT}} = \frac{L_{NG}}{L_{MG}} = \frac{S_{NG}}{S_{MG}}$$

Thus, if we once again assume that LNG=3×LMG, but that the hydraulic cylinders 505 have the same total area, then LNG-MOUNT/LPISTON-MOUNT=3 provides hydro-mechanical equilibrium. This approach allows all of the tilting hydraulic cylinders to be identical for lower cost.

Figure 6A:
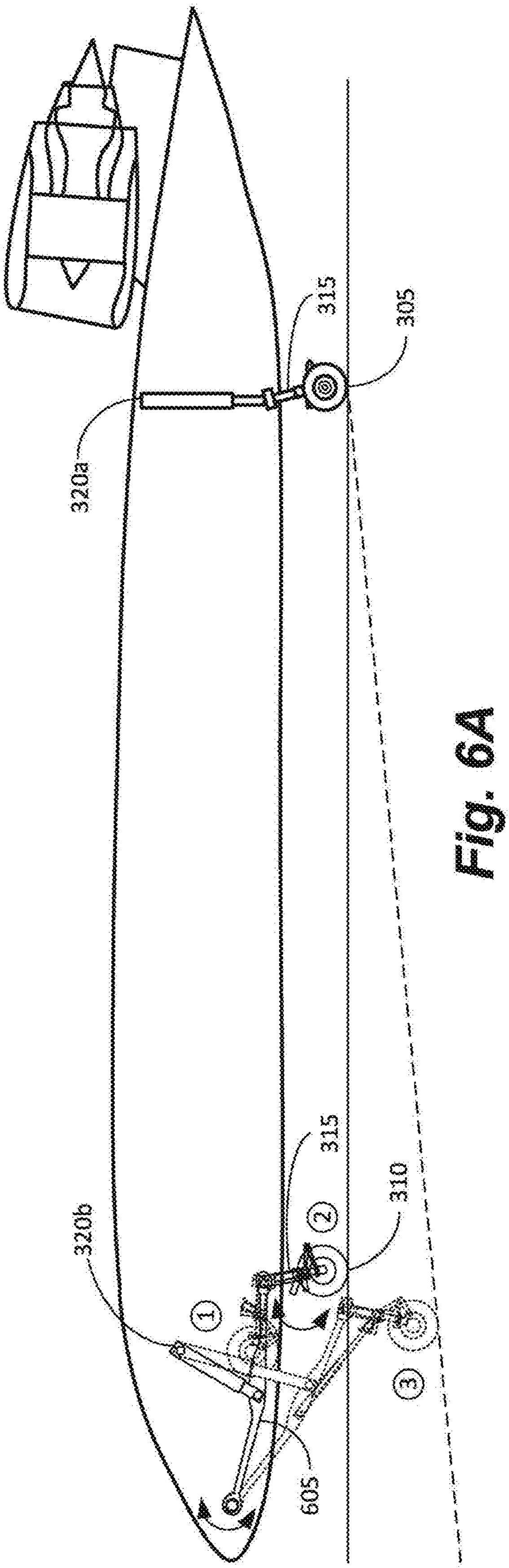
FIG. 6A is a side view depicting a blended-wing aircraft with a rearward pivoting swingarm landing gear system, in accordance with some examples of the present disclosure.

Of course, the linkages for the landing gear can take many forms. As shown in FIG. 6A, for example, the nose gear 310 can be mounted on a rear-swinging swingarm 605. As discussed above, this can enable the nose hydraulic cylinder 320*b* to have a shorter stroke, while providing sufficient travel for the nose gear 310. As shown, the nose gear 310 can have at least three positions. In the first position, ①, the rear-swinging swingarm 605 is in the fully retracted position. In this position, the nose gear 310 is fully retracted inside the fuselage to enable the landing gear doors to be closed, for example. In the second, or intermediate position, ②, the rear-swinging swingarm 605 is in substantially the same position, but the nose gear 310 is rotated to a position that supports the fuselage such that it is substantially level with the ground. This can be referred to as the "ground position" in that it can enable the aircraft to taxi and to be loaded and unloaded in the convention manner.

In the third position, ③, or pitch angle position, the rear-swinging swingarm 605 (and thus, the nose gear 310) can be lowered to raise the nose of the aircraft to create the desired pitch angle. As discussed above, the pitch angle position can be used to place the aircraft in the proper configuration for takeoff, for example, while requiring very little force to be supplied by the aerodynamic surfaces (e.g., only enough to upset the equilibrium). In this manner, the aircraft can be rotated for takeoff, for example, despite there being a large distance (and a resulting large moment) between the landing gear and the CG.

In some examples, the high pitch angle position can also be used for landing. For most aircraft, lowering the nose as quickly as possible reduces landing distance. However, for some aircraft holding the nose at high pitch angle adds drag to reduce landing distance. In this instance, the nose gear 310 can be placed in the high pitch angle position prior to landing such that, when the nose gear 310 touches down, the aircraft maintains the high angle for deceleration. The aircraft can then be slowly rotated to the ground position during deceleration. In some examples, the force required to cause the (de)rotation on landing can be provided by the aircraft's braking system.

In some examples, the hydraulic pipe 405 can be sized and/or can include an orifice, to provide the desired rotation rate. In other words, the hydraulic pipe 405 can include a restriction to prevent the nose gear 310 from collapsing in an uncontrolled manner. In some examples, the system 500 can include a pump 435 to provide a slight forward bias. In the manner, the nose gear 310 can maintain the pitch angle position until overcome by braking forces. At this point, the pump 435 can be turned off or reversed to enable the system 500 to rotate back to the ground position.

In some examples, the pitch angle position for landing and takeoff can place the fuselage at the same pitch angle. In other examples, the pitch angle position can comprise at least two different positions—a landing pitch angle position and a takeoff pitch angle position.

Figure 6B:
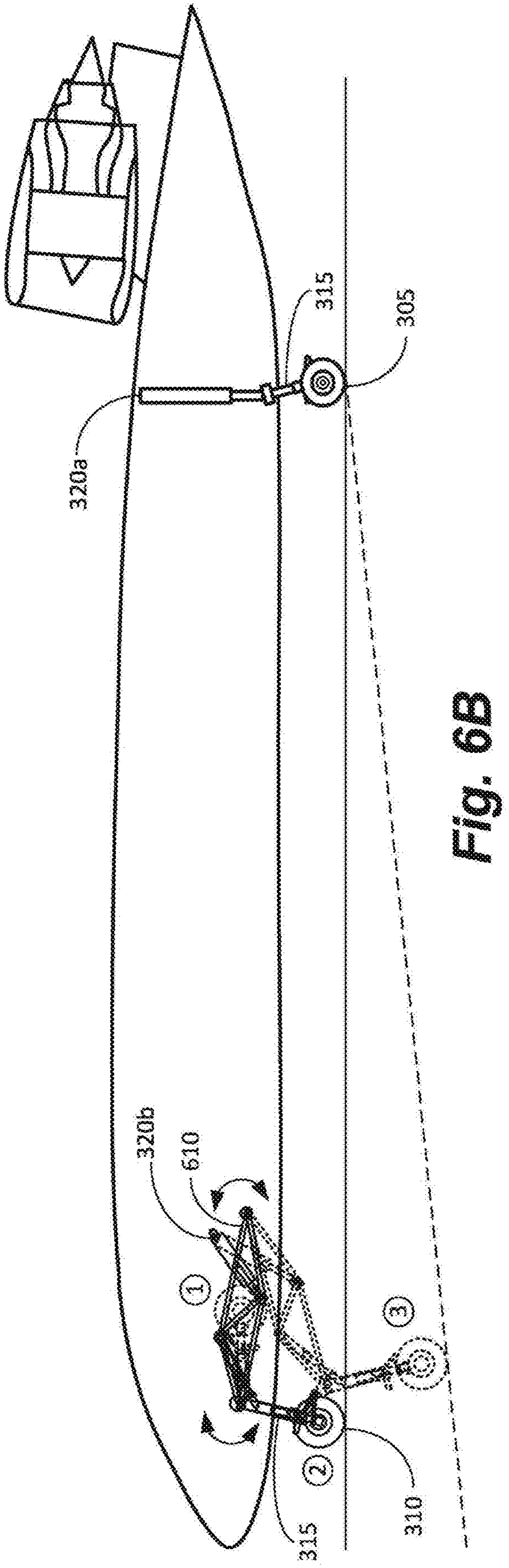
FIG. 6B is a side view depicting a blended-wing aircraft with a forward pivoting, folding swingarm landing gear system, in accordance with some examples of the present disclosure.

As shown in FIG. 6B, in some examples, the system can include a forward-swinging swingarm 610. Similar to the rear-swinging swingarm 605, the forward-swinging swingarm 610 can enable a shorter stroke nose hydraulic cylinder 320*b* to be used. In addition, in some examples, the forward-swinging swingarm 610 can include an additional pivot 615 to enable the oleo strut 315 to be folded when in the first position, ①. In this manner, the nose gear 310 can be stowed in a smaller space when in the first position. As before, the forward-swinging swingarm 610 can also comprise a ground position, ②, for taxiing and ground operations, and a pitch angle position, ③, for takeoff and/or landing.

As before, regardless of the nose gear 310 configuration, in addition to raising the nose, the main gear 305 can also squat to provide additional rotation by simply collapsing the main hydraulic cylinder 320*a*. In the ground position, on the other hand, the main hydraulic cylinder 320*a* can be raised to place the aircraft in a substantially level position with respect to the ground.

Figure 7A:
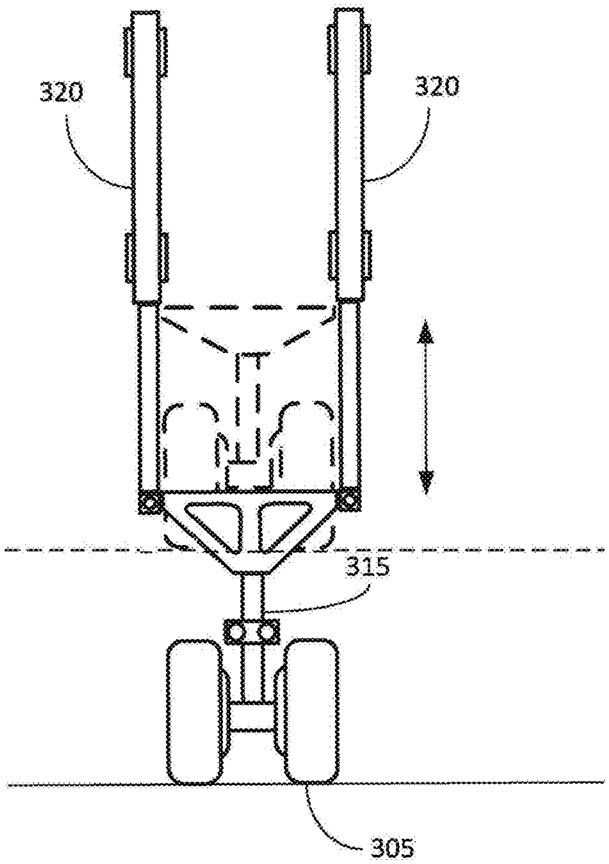
FIG. 7A is a front view depicting a landing gear with direct-linear actuators, in accordance with some examples of the present disclosure.

As shown in FIG. 7A, the nose gear 310 or main gear 305 can be mounted to the hydraulic cylinders 320 in a substantially linear manner. In other words, in some examples, the oleo strut 315 can be mounted directly to the hydraulic cylinders 320 using a brace 705, for example, or other suitable means. In this configuration, extension or retraction of the hydraulic cylinders 320 results in the same extension or retraction of the landing gear 305, 310. This can enable the system to be relatively simple, compact, lightweight, and robust.

Figure 7B:
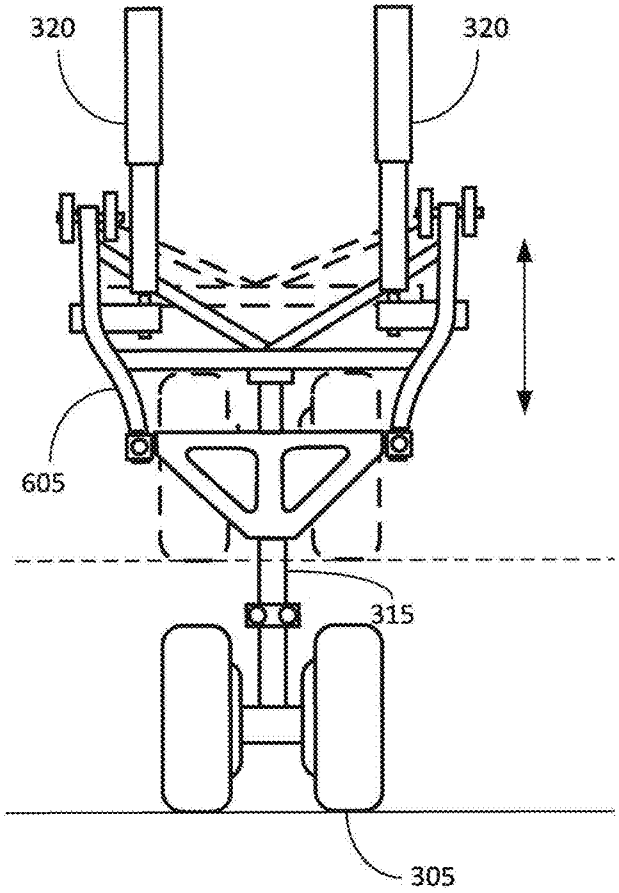
FIG. 7B is a front view depicting a landing gear with linear actuators acting via a swingarm, in accordance with some examples of the present disclosure.

In other examples, as shown in FIG. 7B, the nose gear 310 or main gear 305 can be mounted to the hydraulic cylinders 320 via the forward 610 or rearward 605 pivoting swingarm. In other words, in some examples, the oleo strut 315 for either landing gear 305, 310 can be mounted to the hydraulic cylinders 320 via the forward 610 or rearward 605 pivoting swingarm using a brace 705, for example, or other suitable means. In this configuration, extension or retraction of the hydraulic cylinders 320 can create a proportionately larger extension or retraction of the landing gear 305, 310. This can enable the hydraulic cylinders 320 to be shorter for a given landing gear 305, 310 travel, which can improve packaging. In addition, as discussed above, the swingarm may include additional pivots to enable the landing gear 305, 310 to fold when retracted. This can enable the landing gear 305, 310 to be stowed more compactly when retracted in flight.

Figure 8A:
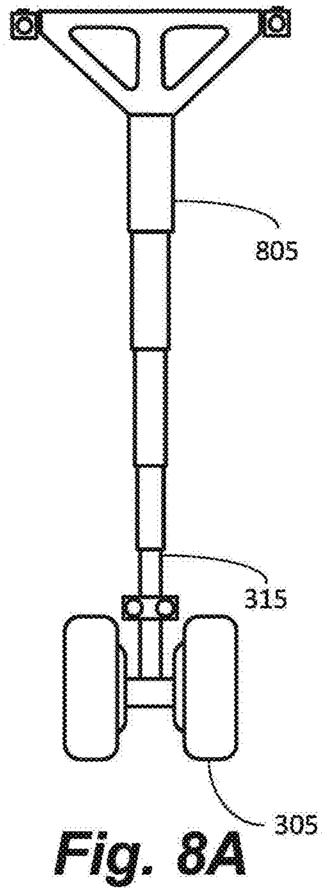
FIGS. 8A and 8B are front views depicting a telescoping landing gear in the extended position (FIG. 8A) and the retracted, or collapsed, position (FIG. 8B), in accordance with some examples of the present disclosure.
Figure 8B:
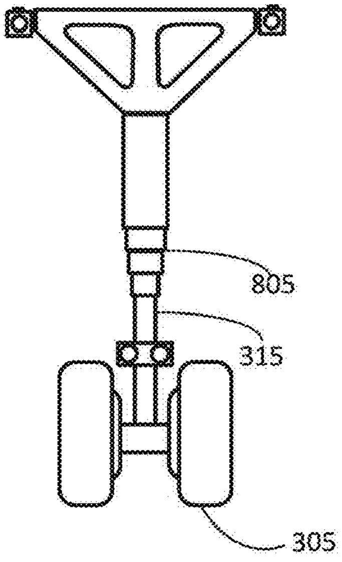

In still other examples, as shown in FIGS. 8A and 8B, the system can include a telescoping strut mount 805. In this configuration, the oleo strut 315 and landing gear 305, 310 can be mounted to the telescoping strut mount 805. The telescoping strut mount 805, in turn, can be moved between a first, extended position (FIG. 8A) and a second, retracted position (FIG. 8B). Thus, the telescoping strut mount 805 can place the aircraft in the pitch angle position at or near the first position and can place the aircraft in the ground position at or near the second position. In some examples, the ground position can be in between the first position and the second position. In this configuration, the first, fully retracted position may enable the nose gear 310 to squat for service, loading, or other reasons (i.e., the second position may be below the ground position).

Figure 9:
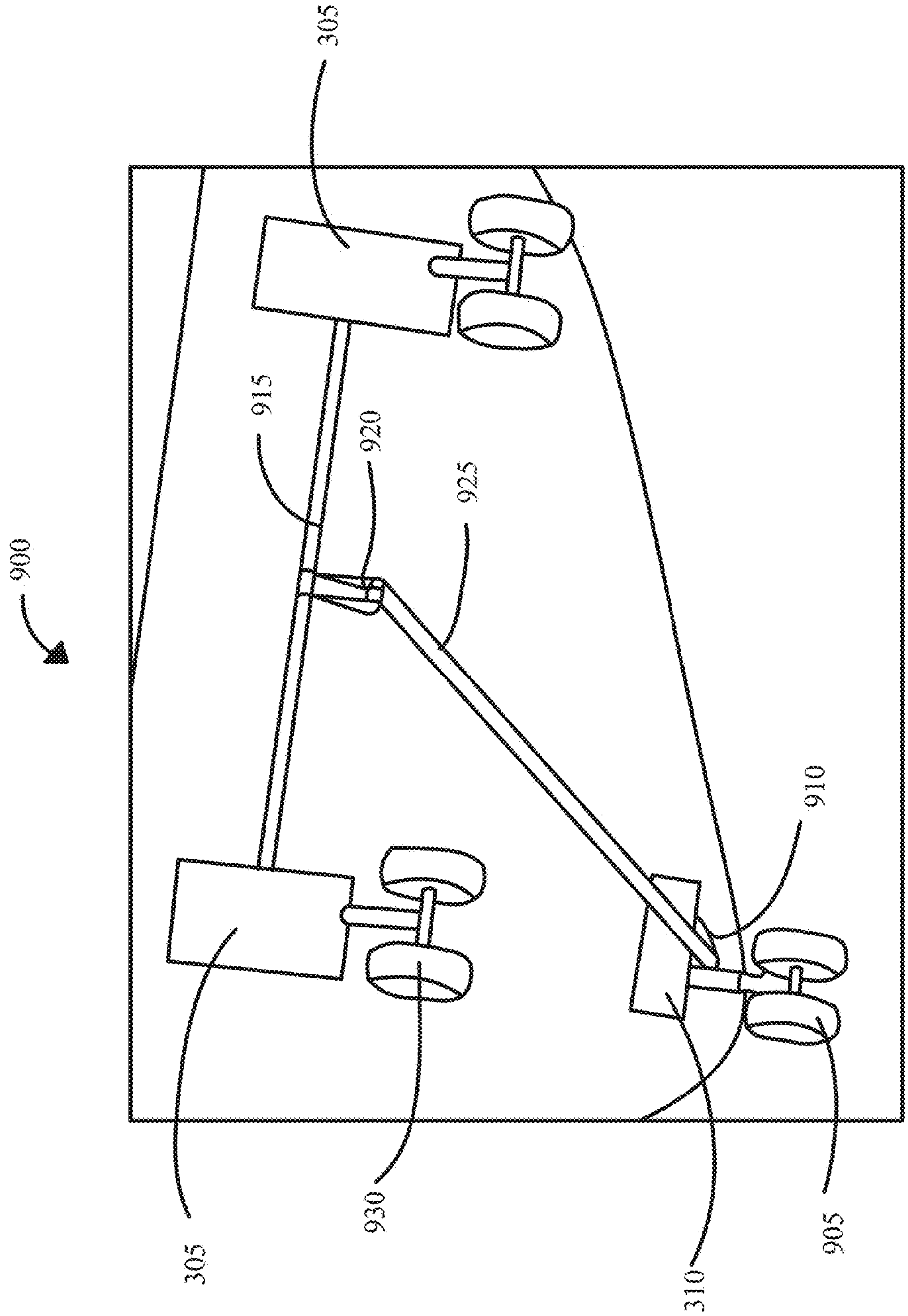
FIG. 9 is an exemplary embodiment of mechanically coupled landing gear.
Figure 10:
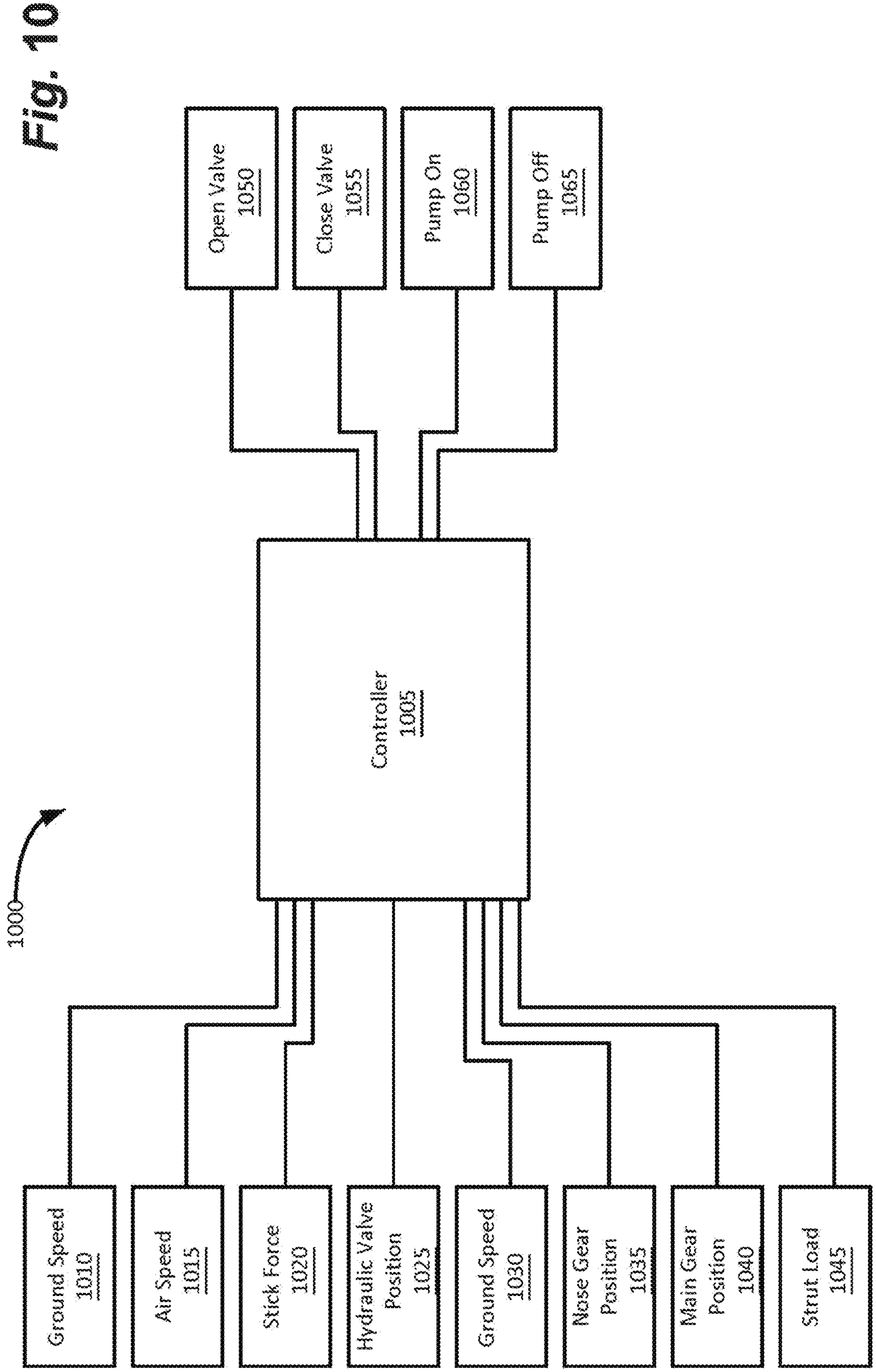
FIG. 10 is a schematic diagram of a control system for the rotating landing gear system, in accordance with some examples of the present disclosure.

Alternatively, and as shown in FIG. 9, a landing gear system 900 may include mechanically linked gears. In this configuration, main gear 305 and nose gear 310 may be linked by a mechanical connection. As used in the current disclosure, "mechanically connected" is when the fore and the aft landing gear (nose and main landing gear, respectively) are configured to move along the vertical axis in tandem. As used herein, "in tandem" means that the main gear and the nose gear work together, such that one affects the other. In embodiments, when the pair of aft landing gear rises the fore landing gear may be lowered. In other embodiments, when the fore landing gear rises the aft landing gear may lower.

Further, landing gear system may also include non-coupled landing gears (i.e., landing gears in which the nose gear 310 and the main gear 305 are not mechanically communicative with one another) may operate separately from each other. For example, and without limitation, a change in the nose gear may not affect the main gear. In some instances, only the nose gear may extend and compress, while the main gear remains in a fixed position. In other cases, nose gear may be communicatively coupled to main gear using a controller or any other computing device described herein.

In such cases, nose gear 310 may include a jump strut, wherein the "jump strut," for the purpose of this disclosure, is a dampener that resists vertical compression that is often part of the suspension of a landing gear. In some cases, jump strut may be varied in length, gradually or more rapidly, during the takeoff roll, similar to the two-position gear. Gradual extension may be at 0.01 m/s or 0.001 m/s, or the like, while rapid extension may be at 1 m/s, 0.1 m/s, or the like. During a gradual extension, aircraft may include a nose-low AOA at roll but a nose-high AOA at takeoff, which may reduce the need for an aerodynamic pitching moment to rotate. In a non-limiting example, a nose-low angle may range between 0° to +5° (a wider range may be −3° to +7°), while a nose-high angle may range between +3° to as much as +6° (a wider range may be +2° to +10°).

During a rapid extension, full extension may be achieved when aircraft reaches rotation speed. In an embodiment, this may achieve a positive pitch rate at the end of the nose gear 310 extension, which may propel the nose even higher, reducing takeoff distance. Jump strut may only extend after a decision to take-off is made, the jump strut preserves good breaking characteristics in case of an abandoned takeoff, as the nose remains in a low AOA. During landing, the jump strut may remain in the "short" position, permitting a conventional landing de-rotation. A "short" position during landing may benefit braking, improve steering, and decrease lift.

Still referencing FIG. 9, nose gear 310 may include a nose wheel 905. As used in this disclosure, "nose wheel" is a wheel component within a nose gear landing gear assembly that is configured to make contact with and roll on the ground. Wheel may include a pneumatic tire, or the like. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximize the amount of rubber making contact with the ground to decrease the landing distance and/or enhance braking performance. Nose gear 310 may be connected to a nose linkage 910. A nose linkage 910 may be a sector, gear, cam, or the like, that helps translate motion from one gear to another. As used herein, a "sector" is a partial pully that provides extension to a system. A sector may be composed of materials such as aluminum, steel, polycarbonate, carbon fiber, fiber glass, or the like. A sector may act as a cam, such that it creates a relationship between cable motion of a main cable, as discussed below, and rotary motion of a shaft, such as a lateral shaft as discussed below. In an embodiment, compression of oleo struts 315 attached to a nose wheel 905 may translate to the nose linkage 910 such that it provides extension to a main gear 305. In another embodiment, nose linkage 910 may transfer the movement of a main gear 305 to movement of the nose wheel 905.

Continuing to reference FIG. 9, Main gear 305 may be coupled to a lateral shaft 915. Lateral shaft may be a torque tube. A "torque tube" as used herein, transmits force by torsion. A main linkage 920 may be located on the lateral shaft 915. Main linkage 920 may be located at the center of the lateral shaft 915. Main linkage 920 may be located partially off center of the lateral shaft 915. Main linkage 920 may transform movement of the lateral shaft 915 into movement of the nose gear 310. Main linkage 920 may include a sector, cam, gear, or the like. Lateral shaft may receive movement from main gear 305. Alternatively, or additionally, main linkage 920 may transform movement of nose gear 310 to movement of main gear 305.

Continuing to reference FIG. 9, main linkage 920 and nose linkage 910 may be connected by a longitudinal member 925. Longitudinal member 925 may be a tension cable. A "tension cable," as used herein, is one or more ropes, wires, or the like, that are in tension. Tension cables may be made of steel wires, or other metal wires. Tension cable may be wrapped in a sheath of plastic. Longitudinal member may be a bar, tube, chain, belt, or the like, that translates movement from a sector to another. Longitudinal member 925 may run down the centerline of the aircraft, longitudinally. Longitudinal member 925 may be a plurality of cables, such as a dual set of cables on opposite sides of the aircraft's centerline. Longitudinal member 925 may be driven by the main linkage 920 and/or the nose linkage 910 such that movement from one linkage may be translated through the longitudinal member 925 and affect the other linkage. Longitudinal member 925 may be a continuous loop of cables that engage through the main linkage 920 and the nose linkage 910.

Additionally, or alternatively, longitudinal member 925 may be the "rope" that threads through the partial pulleys. In a non-limiting example, main linkage 920 and/or nose linkage 910 may each include one or more pulleys. Longitudinal member 925 may, when actuated by an external force or mechanism, adjust the position of main linkage 920 and nose linkage 910 simultaneously. Longitudinal member 925 may be composed of materials such as KEVLAR, TECHNORA, VECTRAN, and/or SPECTRA. Longitudinal member 925 may also be composed of metals such as steel, aluminum, titanium, or the like. Longitudinal member 925 may accommodate differential thermal expansion between the cable and an airframe of the aircraft.

Examples of the present disclosure can also comprise a system 1000 for monitoring and controlling the position of the landing gear. The system 1000 can include a controller 1005 for receiving inputs and providing outputs to control the position of the landing gear. The controller 1005 can comprise, for example, a dedicated microcontroller, a laptop or desktop computer, a module, an integrated circuit, or other suitable electronic device. The controller 1005 can include a processor, one or more types of memory, and one or more communication buses for connection to aircraft systems, sensors, and or actuators.

The system 1000 can also include one or more sensors to provide information to the controller 1005. The system 1000 can include, for example, a ground speed indicator 1010, and airspeed indicator 1015, and a stick force sensor 1020. The system 1000 can also include a hydraulic valve position sensor 1025, a hydraulic pressure sensor 1030, a nose gear position sensor 1035, a main gear position sensor 1040, and a strut load sensor 1045.

As the names imply, the ground speed indicator 1010 and air speed indicator 1015 provide the velocity of the aircraft with respect to the ground and the air, respectively. In some examples, the ground speed indicator 1010 can comprise a mechanical or electronic speedometer mounted to the landing gear 305, 310. In other examples, the ground speed indicator 1010 can be provided by GPS, LORAN, or other suitable means. The air speed indicator 1015 can comprise a pitot tube, or other suitable pressure measurement device. In some examples, the system 1000 can use a standalone ground speed indicator 1010 and air speed indicator 1015. In other examples, this information can be provided by existing avionics already installed on the aircraft.

In order to prevent the landing gear 305, 310 from rotating at inopportune times, the system 1000 can prevent rotation until certain conditions are met. One possible condition is that the aircraft is at, or near, the proper rotation speed, or V1, for example, or a proper, or reference, landing speed, VREF. A second possible condition is that the pilot is requesting the rotation. To this end, the system 1000 can also include a stick force sensor 1020. As the name implies, the stick force sensor 1020 can measure the input of the pilot on the flight control stick or yoke. Thus, when the force applied by the pilot rearward on the stick ("pulling up" in the stick) reaches a predetermined force, the controller 1005 can initiate the landing gear rotation.

In some examples, such as in a system with active hydraulics (discussed above), the system 1000 can also include a hydraulic pressure sensor 1030. This can ensure that the landing gear 305, 310 remains locked unless and until there is sufficient pressure to affect the desired rotation. Of course, in a passive system, the hydraulic pressure sensor 1030 may serve only to ensure there is not a pressure leak, or other failure.

The system 1000 can also include one or more nose gear position sensors 1035 and main gear position sensors 1040. The position sensors 1035, 1040 can determine that the landing gear 305, 310 is initially in the ground position, for example. The position sensors 1035, 1040 can also determine when the landing gear 305, 310 is in the pitch angle position for takeoff and/or landing. As discussed below, the controller 1005 can close the hydraulic valve to lock the landing gear 305, 310 in a particular position, based on feedback from the position sensors 1035, 1040. The positions sensors 1035, 1040 can comprise, for example, capacitive displacement sensors, piezo-electric transducers, potentiometers, proximity sensors (e.g., optical), or rotary encoders (e.g., angular). The position sensors 1035, 1040 can be linear and can be mounted directly on the hydraulic cylinders 320, for example, or can be rotary and can be connected to the hydraulic cylinders 320 or landing gear 305, 310 via pivoting arms.

The system 1000 can also include a strut load sensor 1045. The strut load sensor 1045 can measure the load, or position, of the oleo strut 315. Thus, on takeoff or landing, the landing gear 305, 310 can be locked in position based on whether the oleo strut 315 is loaded (on the ground) or not. On takeoff, the landing gear 305, 310 can be locked in the pitch angle position, for example, until the strut load sensor 1045 determines that the nose gear 310, main gear 305, or both has been unloaded indicating the aircraft is airborne. At this point, the system 1000 can open the hydraulic valve 410, for example, to return the landing gear 305, 310 to the desired position (e.g., the ground position). The controller 1005 can also enable the landing gear 305, 310 to be folded to the stowed, in-flight position.

The controller 1005 can also provide outputs to control the system 1000. The controller 1005 can send the appropriate signal to the hydraulic valve 410, for example, to open 1050 or close 1055 base on the inputs from the various sensors. If the controller 1005 determines that (1) the ground speed indicator 1010 indicates the aircraft is at or near V1 and (2) the stick force sensor 1020 indicates that the pilot is applying a predetermined amount of rearward force on the stick (e.g., 5-10 lbs.), then the controller 1005 can send a signal 1050 to open the hydraulic valve 410.

The hydraulic valve 410 enables hydraulic fluid to flow from the main hydraulic cylinder 320*a* to the nose hydraulic cylinder 320*b*. This enables the main gear 305 to squat and the nose gear 310 to raise to achieve the pitch angle position.

When the strut load sensor 1045 indicates that the nose gear 310, the main gear 305, or both have left the tarmac, the controller 1005 can send a signal 1050 to reposition the landing gear 305, 310 to the appropriate position, after which the hydraulic valve 410 can be closed locking the gear in the proper position for retraction. As discussed above, in some examples, the weight of the main gear 305 hanging down can enable the main gear 305 to re-extend from the pitch angle position and the nose gear 310 to retract.

In some examples, a hydraulic motor or pump 435 can be used to facilitate or expedite movement of hydraulic fluid between the hydraulic cylinders 320. In this configuration, in addition to sending a signal to open 1050 and close 1055 the hydraulic valve 410, the controller 1005 can also send a signal to start 1060 and stop 1065 the pump 435. The pump 435 can enable the hydraulic cylinders 320 to be repositioned regardless of conditions such as, for example, weight destruction, aircraft attitude, and strut loading.

Figure 11:
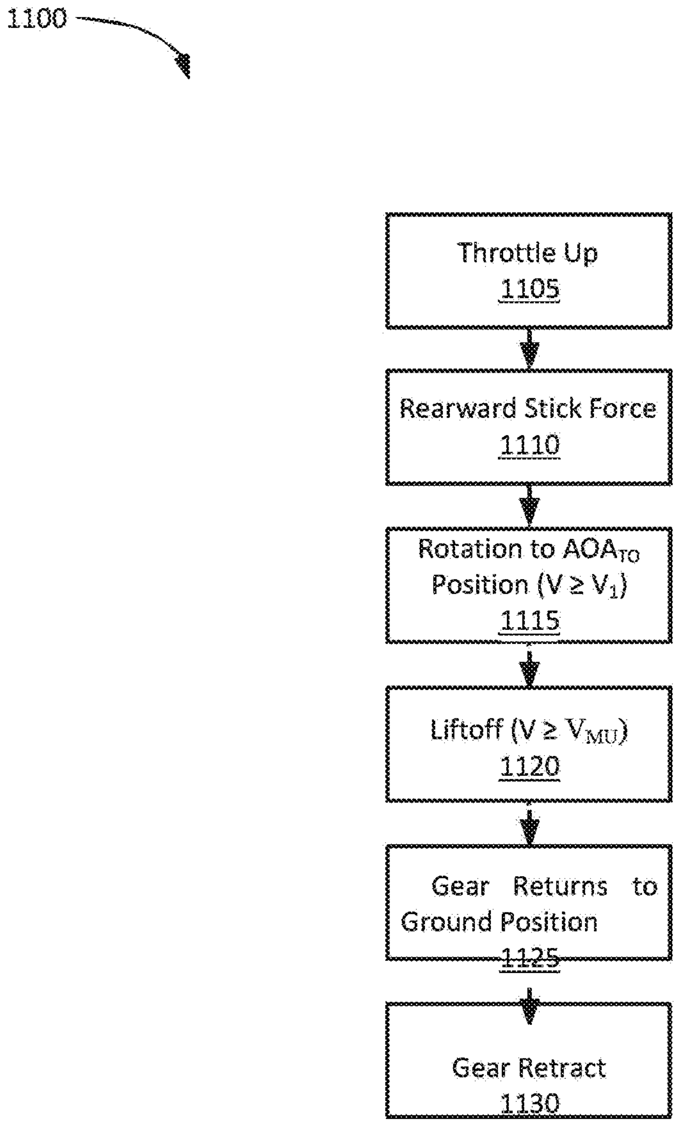
FIG. 11 is a flowchart depicting a method for passively controlling the rotating landing gear system on takeoff, in accordance with some examples of the present disclosure.
Figure 12:
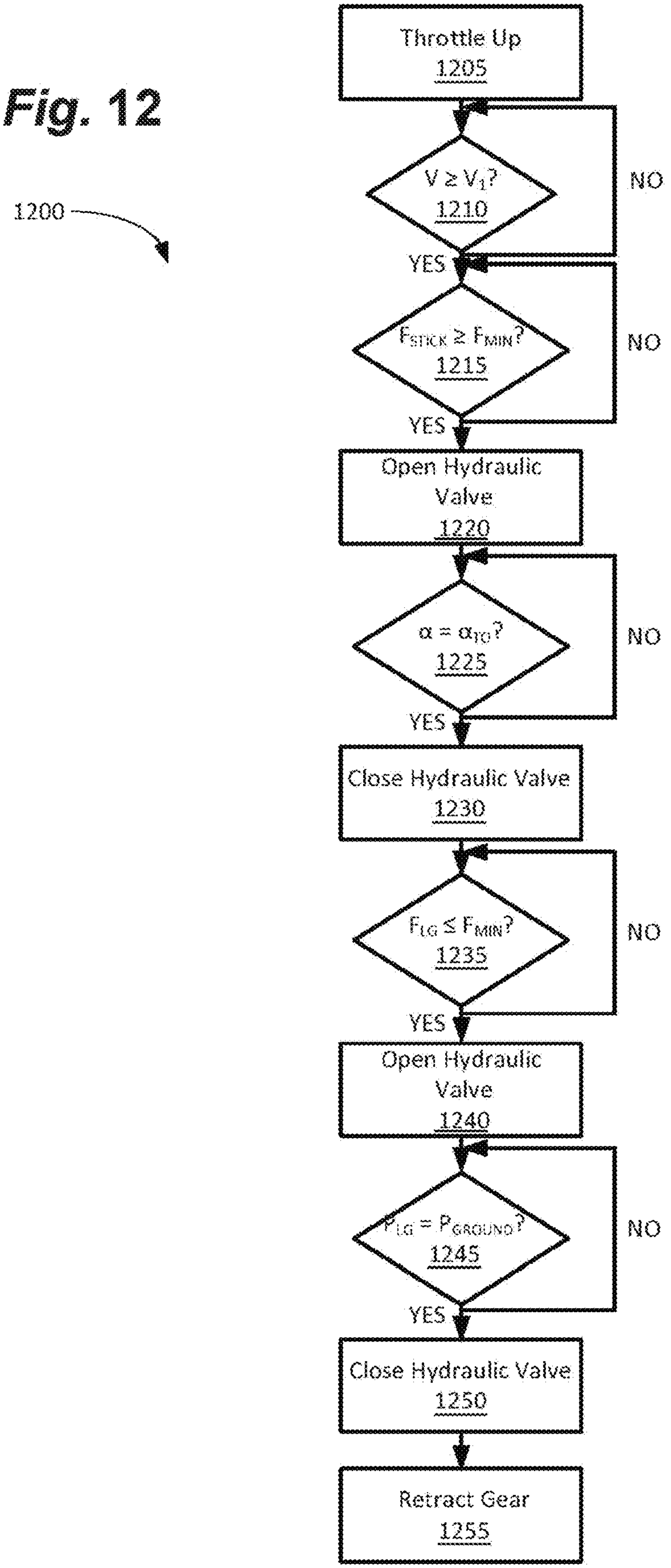
FIG. 12 is a flowchart depicting a method for actively controlling the rotating landing gear system on takeoff, in accordance with some examples of the present disclosure.

Examples of the present disclosure can also include methods 1100, described in FIG. 11, 1200, described in FIG. 12, for mechanically rotating an aircraft for various procedures (e.g., takeoff, taxiing, and/or landing). In some examples, as mentioned above, the system 500 can be substantially passive, relying on weights and balances combined with mechanical and/or hydraulic forces to essentially "balance" the aircraft on the landing gear. In other configurations, the system 400 can use pumps 435 and/or hydraulic valves 410 to actively move and control the aircraft.

In the "passive" configuration, the method 1100 can rely on the mechanical and hydraulic layout to effect movement of the aircraft. At 1105, as in a convention aircraft, takeoff can begin with the engines being throttled up to the takeoff power setting. In a conventional aircraft, the pilot can simply pull back on the stick during the takeoff roll. When the aircraft reaches a predetermined velocity, or $V_1$, the velocity of the plane will be such that the aerodynamic surfaces of the aircraft rotate the nose of the aircraft into the air about the main gear.

Figure 2A:
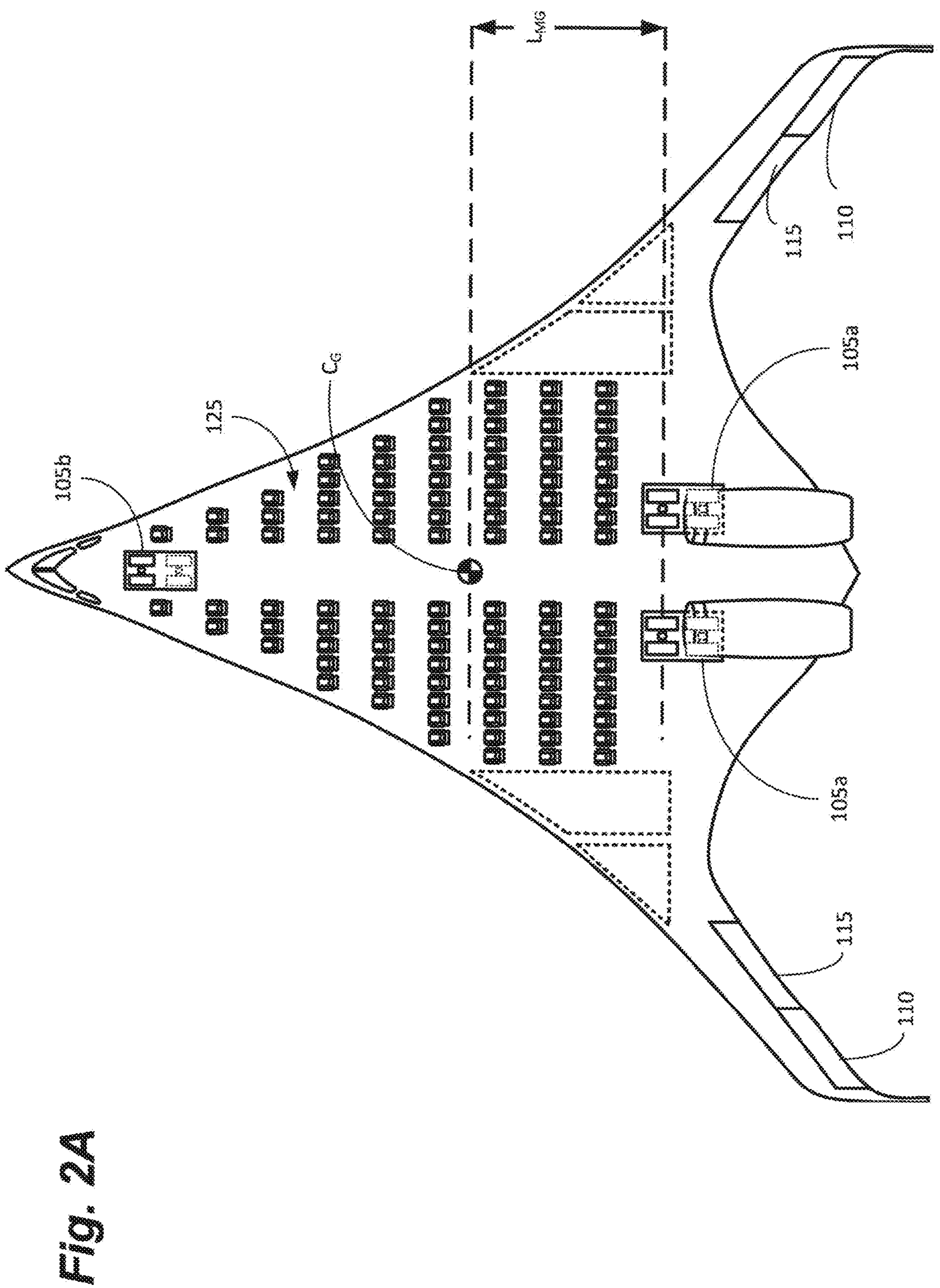
FIGS. 2A and 2B are plan and side views, respectively, depicting a blended-wing aircraft with the main landing gear in a rearward location farther from the CG to improve packaging.
Figure 2B:
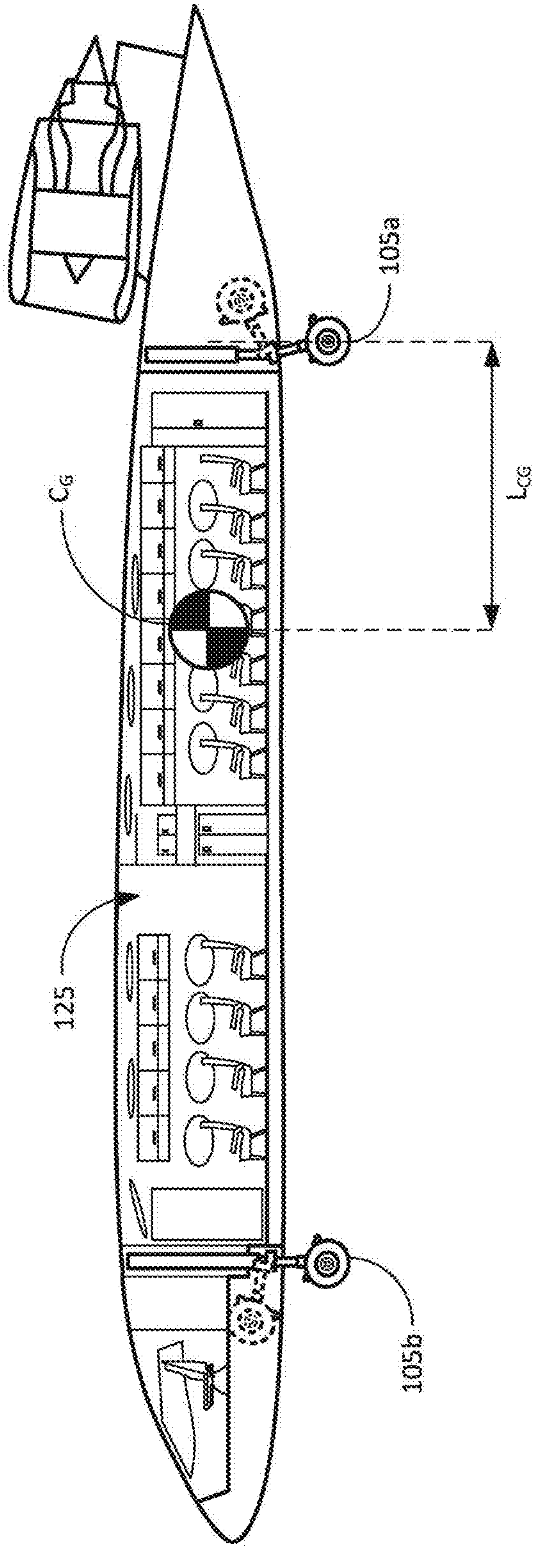

As discussed above, in a blended wing configuration with a rearward main gear 305 placement, for example, the flight control surfaces 120 would normally be unable to create sufficient force to affect rotation. This is due in part to the longer distance between the main gear 305 and the CG (e.g., as shown in FIGS. 2A and 2B). As discussed above, due to the hydraulic equilibrium created by the size, shape, and positioning of the hydraulic cylinders 320, however, rotation about the CG can be provided with very little force from the flight control surfaces 120.

To this end, as the aircraft accelerates, at 1110 the pilot can apply rearward pressure on the stick to deflect the elevons 110 (or elevons, as the case may be). At 1115, when the aircraft reaches the speed at which the aerodynamic forces overcome the inertial of the aircraft, the aircraft can rotate about the CG to the pitch angle for takeoff, pitch angle $AOA_{TO}$. As discussed above, because the aircraft is essentially in equilibrium on the ground, very little force is required for the aircraft to rotate.

As a result, the "Minimum Unstick Speed" ($V_{MU}$) can be low enough that it is not the critical condition for establishing Takeoff Decision Speed ($V_1$). As a result, $V_1$ will generally be a substantially lower speed than would be required with conventional landing gear for any aircraft configuration (e.g., tube and wing vs. blended wing). Indeed, in the blended wing configuration, the force can be reduced from a level that cannot practically be generated using aerodynamics to a force that is lower than is currently required in a conventional tube and wing configuration. This can also significantly improve takeoff distances and climb out because the negative lift that the flight control surfaces 120 create—that the wing must counteract for liftoff—is substantially reduced.

At 1120, when the aircraft reaches the minimum unstick speed, or $V_{MU}$, the aircraft will takeoff. As mentioned above, because very little force is required to rotate the aircraft, the amount of lift required to overcome the negative lift created by the elevons 110 and lift the aircraft is reduced. As a result, $V_{MU}$, takeoff roll, and fuel consumption, among other things, can be reduced.

At 1125, the landing gear 305, 310 can move to another position, such as the ground position. In some examples, the main gear 305 can be heavier than the nose gear 310. When the aircraft takes off, therefore, the weight of the main gear 305 can cause the main hydraulic cylinder 320*a* to extend and the nose hydraulic cylinder 320*b* to retract. In some examples, the ground position can occur when the main gear 305 extends completely (i.e., to the "stops") and the nose gear 310 retracts completely. In this configuration, the landing gear 305, 310 naturally and passively returns to the ground position in the air. Of course, the landing gear 305, 310 could also be configured to return to a landing pitch angle position or a stowed position (e.g., the position in which the landing gear 305, 310 takes up the minimum amount of space when retracted).

At 1130, regardless of the position the landing gear 305, 310 returns to (e.g., ground position, landing pitch angle position, stowed position, etc.), once the landing gear 305, 310 has reached the desired position, the landing gear 305, 310 can be retracted for flight. In the passive configuration, no valves or pumps are required for takeoff and all aircraft and landing gear 305, 310 positioning is provided either by aerodynamic forces or by the relative weights of the landing gear 305, 310. This passive system reduces the complexity of the system, which can reduce weight, cost, and maintenance, among other things.

In some examples, a more active approach may be desired. In the "active" configuration, illustrated in FIG. 12, therefore, at 1205, takeoff can once again begin with the engines being throttled up to the takeoff power setting. At 1210, the system can then monitor the ground speed until the velocity of the aircraft, V, is at or near the velocity at which the aircraft would normally rotate for takeoff, $V_R$ (e.g., $V_R$ is approximately V1-10 knots). Once this velocity is attained, at 1215, the system can then determine if the pilot is pulling back on the stick with at least a minimum stick force, effectively requesting rotation of the aircraft into the pitch angle $AOA_{TO}$ position. At 1220, if both conditions are met—i.e., $V \geq V_1$ and $F_{STICK} \geq F_{MIN}$ then the system can open the hydraulic valve 410 to enable the aircraft to rotate to pitch angle $AOA_{TO}$.

At 1225, the system can determine if the aircraft has achieved the desired pitch angle. The pitch angle may vary based on, for example, whether the aircraft is landing or taking off, temperature, humidity, and takeoff weight, among other things. As discussed above, the pitch angle can be measured using an accelerometer, gyro, or the onboard flight systems.

In some examples, as discussed above, the pitch angle can be a function of system geometry. In this configuration, the system 300, 400 can forgo the hydraulic valve 410, or the hydraulic valve 410 can remain in the open position. In other examples, it may be desirable to hydraulically lock the aircraft at a particular pitch angle based on takeoff weight, weather conditions, etc. In this configuration, at 1230, if $\alpha = a\alpha TO$, the system can close the hydraulic valve 410 to lock the landing gear 305, 310 at pitch angle $AOA_{TO}$.

At 1230, the system can determine if the aircraft has lifted off. As discussed above, this can be achieved by measuring the position of, or the load on, the landing gear 305, 310. If the landing gear 305, 310 is fully "stroked out," for example, then the system can determine that the plane has taken off. This can also be determined when the load on the landing gear 305, 310, $F_{LG}$, drops below a predetermined level $F_{MIN}$—i.e., $F_{LG} > F_{MIN}$. This can also be determined by input from an altimeter, GPS, or other flight instrument on the aircraft.

Regardless of how liftoff is determined, at 1240, the hydraulic valve 410 is either already open, or the method 1200 can open the hydraulic valve 410 to enable the landing gear 305, 310 to reposition. In some examples, as discussed above, the weight of the main gear can be used to simply "pull" the fluid back from the nose hydraulic cylinder 320*b* into the main hydraulic cylinder(s) 320*a* to retract the nose gear 310 and extend the main gear 305. In some examples, the valve can be left open until the landing gear 305, 310 returns to the ground position, for example, or the pitch angle position for landing.

In other examples, the landing gear 305, 310 can be moved to a "stowed position," where the main gear 305 and nose gear 310 are moved to a position in which the main gear 305 and/or nose gear 310 have a reduced volume over the volume the landing gear 305, 310 occupies when deployed. In other words, a position that minimizes, or at least reduces, the stowed volume of the landing gear 305, 310. In other examples, the stowed position may also enable the main gear 305 or the nose gear 310 to avoid an internal structure, for example. This can be useful, for example, to enable the landing gear 305, 310 to be stowed in the available space, avoiding bulkheads or other equipment. Thus, the landing gear 305, 310 may not necessarily be stowed in the minimum space available, for example, due to size and shape requirements.

At 1245, the system can determine that the landing gear 305, 310 is in the correct position, which may be, for example, the landing, stowed, or ground position. If the ground position is desired, then the system can determine that the position of the landing gear 305, 310, or $P_{LG}$, is equal to the ground position, or $P_{GROUND}$, as discussed above. If the landing gear 305, 310 (or rather, the hydraulic cylinders 320) is in the correct position, at 1250, the system can close the hydraulic valve 410 to lock the gear in place.

Examples of the present disclosure can also comprise a method 1300 for rotating the aircraft upon landing. At 1305, the system can determine if the aircraft is at some appropriate speed to extend the landing gear. This may be a speed, V that is lower than the maximum flap extended speed, $V_{LE}$, for example, but above the reference landing speed, $V_{REF}$. At 1310*m* if the plane is at an appropriate speed, the gear can be extended. At 1315, as before, the system can determine if the pilot is requesting a positive pitch angle. In some examples, the system can determine if the pilot is applying some positive backward pressure on the stick, or if $F_{STICK} \geq F_{MIN}$.

At 1320, if the pilot is pulling back on the stick, the system can activate a pump 435 (e.g., a small turbo-pump) and/or open the hydraulic valve 410. The pump 435 can be used to overcome any bias in the system for the main gear 305 to drop out when in the air. Thus, the pump 435 can provide a slight rearward pressure to the system to cause the main gear 305 to pivot downward and the nose gear 310 to pivot upward. As mentioned above, the hydraulic valve 410 may be used to lock the position of the landing gear 305, 310, but is not required.

At 1325, the system can determine if the landing gear 305, 310 is in the correct position to provide the landing pitch angle, αL. As mentioned above, αL can be the same as, or different than αTO. In some examples, αL may be inherent in the landing gear 305, 310. In other words, when the main gear 305 is fully retracted and the nose gear 310 is fully extended, then the aircraft is at the proper attitude for αL. In other examples, the system can determine whether the landing gear 305, 310 is in the correct position based on position sensors, or other means, and either idle the pump 435 or deactivate the pump 435. At 1330, the system can optionally close the hydraulic valve 410 to lock the landing gear 305, 310 in the αL position.

At 1335, the system can determine if the aircraft has touched down. Thus, if the force, $F_{LG}$, on the landing gear 305, 310 is greater than some minimum force, $F_{MIN}$, the system can determine that the aircraft has touched down. In some examples, this can be determined using some direct method, such as measuring the position of, or pressure in, the oleo strut 315 or hydraulic cylinders 320. In other examples, the system can use input from an altimeter, instrument landing system (ILS), or other means to determine the aircraft is on the ground.

At 1340, after determining that the aircraft is on the ground, the system can deactivate or idle the pump 435. If the hydraulic valve 410 was closed previously, the system can also open the hydraulic valve 410. In some examples, the weight transfer caused by the aircraft braking upon landing can cause the nose gear 310 to pivot upward and the main gear 305 to pivot downward. In some examples, the aircraft may also have a slight forward weight bias to cause the aircraft to rotate slowly back to the ground position. In some examples, the pump 435 can be reversible (e.g., a small turbo-pump) to pump fluid from the nose gear 310 to the main gear 305. In some examples, the hydraulic circuit (e.g., the hydraulic pipe 405) can include an orifice, or other restriction, to control the rate at which the nose gear 310 retracts and the main gear 305 extends. At 1345, the system can determine if the aircraft is in the ground position, $P_{GROUND}$. As before, this can be done in a variety of ways. In some examples, the aircraft is in $P_{GROUND}$ when the nose gear 310 is fully pivoted upward and the main gear 305 is fully pivoted downward. Thus, a slight weight bias towards the nose gear 310 can cause the aircraft to naturally assume $P_{GROUND}$. At 1350, the hydraulic valve 410 can optionally be moved to the closed position to hydraulically lock the aircraft in $P_{GROUND}$. This can be useful if the aircraft does not naturally maintain $P_{GROUND}$—e.g., both the nose gear 310 and main gear 305 are in some intermediate position in $P_{GROUND}$. In some examples, it may simply be desirable to lock the position of the aircraft with the hydraulic valve 410 to prevent pitching during, for example, taxiing, refueling, loading, unloading, and maintenance.

EXAMPLE 1

As discussed above, it is convenient to locate the main gear 305 behind the rear- spar where there is ample room to store the retracted main gear 305 in the "beaver-tail." To allow the main gear 305 to be tens of feet behind the CG requires a new feature that works in concert with the nose gear 310. The location of the main gear 305 would normally prevent rotation because there isn't enough aerodynamic control moment to lift the plane's weight so far ahead of the main gear 305 axles.

To solve this, the main gear 305 and nose gear 310 are mounted to hydraulic cylinders 320 of approximately equal diameter for all three landing gears (one nose gear 310 and two main gear 305). The nose gear 310 and main gear 305 are plumbed together with a smaller hydraulic pipe 405 and share hydraulic fluid. The system can be passive so pumps 435 are not necessary, but may nonetheless be used. A hydraulic valve 410, between the nose gear 310 and main gear 305, can hydraulically lock the system when desired. Connecting the nose and main gear hydraulically allows the plane to rotate about the CG with no jacking of the plane's weight. As the plane rotates nose-up, the fluid in the main gear 305 cylinders is forced forward to fill the nose gear 310 cylinder where it supports its share of the plane's weight. The piston areas are sized to achieve the needed proportions between main gear 305 squat, and nose gear 310 stroke-out to pivot about the CG. These pistons mate to conventional oleo struts 315 with the wheels, tires, and brakes.

The systems 300, 400 can function for takeoff rotation and landing de-rotation. During other phases like taxi, takeoff, roll up to $V_1$, or landing after de-rotation, the plane can be locked in the level, or ground, position. Under braking the systems 300, 400 can be locked to prevent the braking force from jacking the nose upward. This can be done by closing the hydraulic valve 410 in the hydraulic pipe 405 between the nose gear 310 and main gear 305. Preventing flow from the nose gear 310 to the main gear 305 hydraulically locks the system. A slight bias in nose gear 310 hydraulic or lever ratio can make the plane very slightly nose- heavy. This can prevent the plane from pitching upward if the hydraulic valve 410 is opened during ground operations.

As discussed above, the hydraulic valve 410 can be opened whenever the pilot shows intent to change pitch attitude, but should not open if the stick is bumped or slightly nudged. Thus, a stick-force dead-band of approximately ±5 lbs can be used. Since takeoff rotation is a safety critical function, the systems 300, 400 can be a fail-open system.

The hydraulic pipe 405 (e.g., piping, a hose, or tubing) from the main gear 305 to the nose gear 310 causes the plane to pivot about the CG without jacking the CG vertically. This results in dramatically smaller control moments required to place the plane at lift-off attitude for takeoff. The small moment means a small elevon 110 down-load doesn't oppose the plane's natural coefficient of lift at minimum unstick speed, or $C_{LVMU}$, capability. This improvement in the down force required at $V_{MU}$ results in approximately 29% better $C_{LVMU}$ at a fixed Ground-Angle-Limit ($G_{AL}$) which is equivalent to about 25 knots in minimum unstick speed ($V_{MU}$) benefit.

In one example, the nose gear 310 can be located about three times as far from the CG in the forward direction, as the main gear 305 is in the aft direction. In this configuration, all three landing gears bear approximately the same "maximum" vertical and braking loads. The main gear 305 maximum load is the static load and it is approximately the same as the maximum nose gear 310 load which occurs during braking. This means that all three landing gears can use common parts except for the addition of steering to the nose gear 310. The 3-to-1 leverage difference means that for every foot the main gear 305 squats at rotation, the nose gear 310 extends 3 times as much. This is exactly what is needed for the plane's virtual pivot point to be near the CG.

A normal blended wing aircraft with a braking coefficient of 0.7 on the main-gear causes the nose-gear to bear approximately 23% of the total airplane weight (so-called "weight transfer") versus a typical load of around 3%-5%. Since the nose gear 310 has no brakes, however, the effective airplane braking coefficient is only about 0.55. With the systems 300, 400 disclosed herein, however, the nose gear 310 is more heavily loaded, so brakes may be added while preserving the needed steering power.

Weight transfer under braking can now be exploited since the nose gear 310 has brakes. The airplane braking coefficient can now be approximately the same as the individual braking coefficient. That is, the full braking effect is preserved for an approximately 29% improvement in overall braking performance. This also benefits takeoff field length and landing field length. Brakes on the nose gear 310 do not diminish steering relative to a traditional lightly loaded nose gear 310 because the high nose gear 310 load reduces the steer angle required to generate a side-load on the nose gear 310. The amount of the friction devoted to steering can be very small, allowing full braking while steering, similar to in a car.

The systems 300, 400 add hardware that is absent in traditional landing gear. This can increase weight and cost. Landing gear weight includes wheels, tires, brakes, and struts. The struts generally account for about 35% of the total gear weight. Adding the systems 300, 400 roughly triples the strut weight component. Therefore, we can expect the systems 300, 400 to increase gear weight by 70%. For most airplanes the total landing gear complement is approximately 4% of gross weight ($G_W$) so the systems 300, 400 hardware adds approximately 2.8% to the $G_W$.

The standard wheel wells for a blended wing aircraft, however, are generally within the pressure vessel. Thus, the pressure vessel surface area is increased by the side-walls of the wheel well adding approximately 12% to the wall area. To compensate for the wheel well penetrations, the payload compartment is required to grow another 15%. Thus, the pressure bearing wall area of the pressure vessel increases approximately 30%. The pressure vessel of a typical blended wing aircraft accounts for 9% of the total $G_W$. As a result, the price of the gear penetrations is 2.7% in $G_W$. This almost entirely cancels the cost of the systems 300, 400. This also does not take into account the reduced drag of the smaller pressure vessel, which more than offsets the weight of the systems 300, 400.

The Federal Aviation Regulations set forth requirements for determining takeoff and landing field lengths. Landing is relatively straight-forward because there is an air distance between the point at which the plane is 50 ft above-ground-level and the touchdown point. Next there is a distance where the plane is de-rotated so all 3 landing gears are on the ground. Finally there is a braked deceleration to zero speed. The systems 300, 400 reduce the braked deceleration portion by approximately 500 ft., equivalent to an approximately 11% reduction in landing field length ($L_{FL}$).

Figure 14:
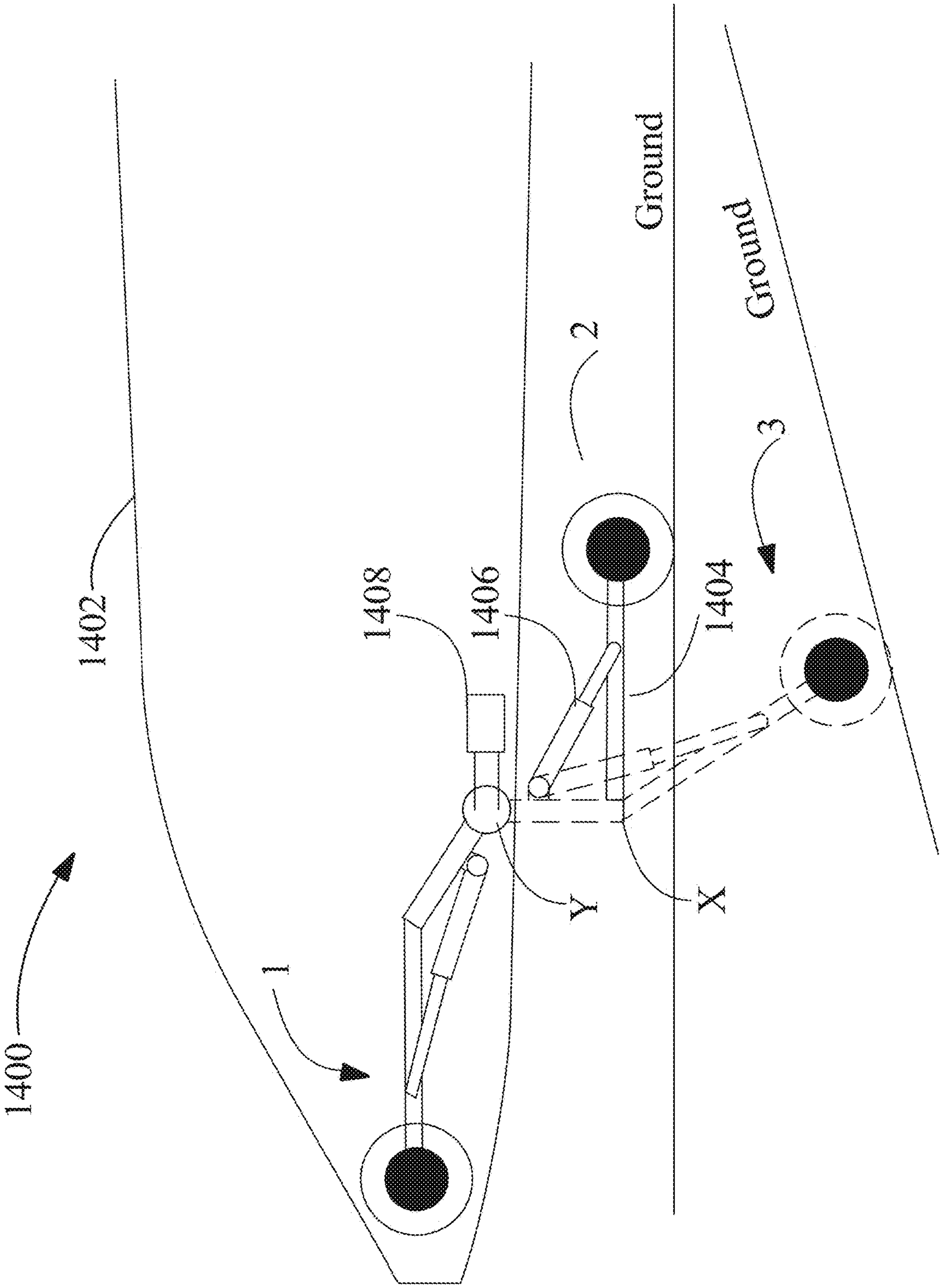
FIG. 14 is a side view of a trailing link pivot-piston, in accordance with some examples of the present disclosure.
Figure 15:
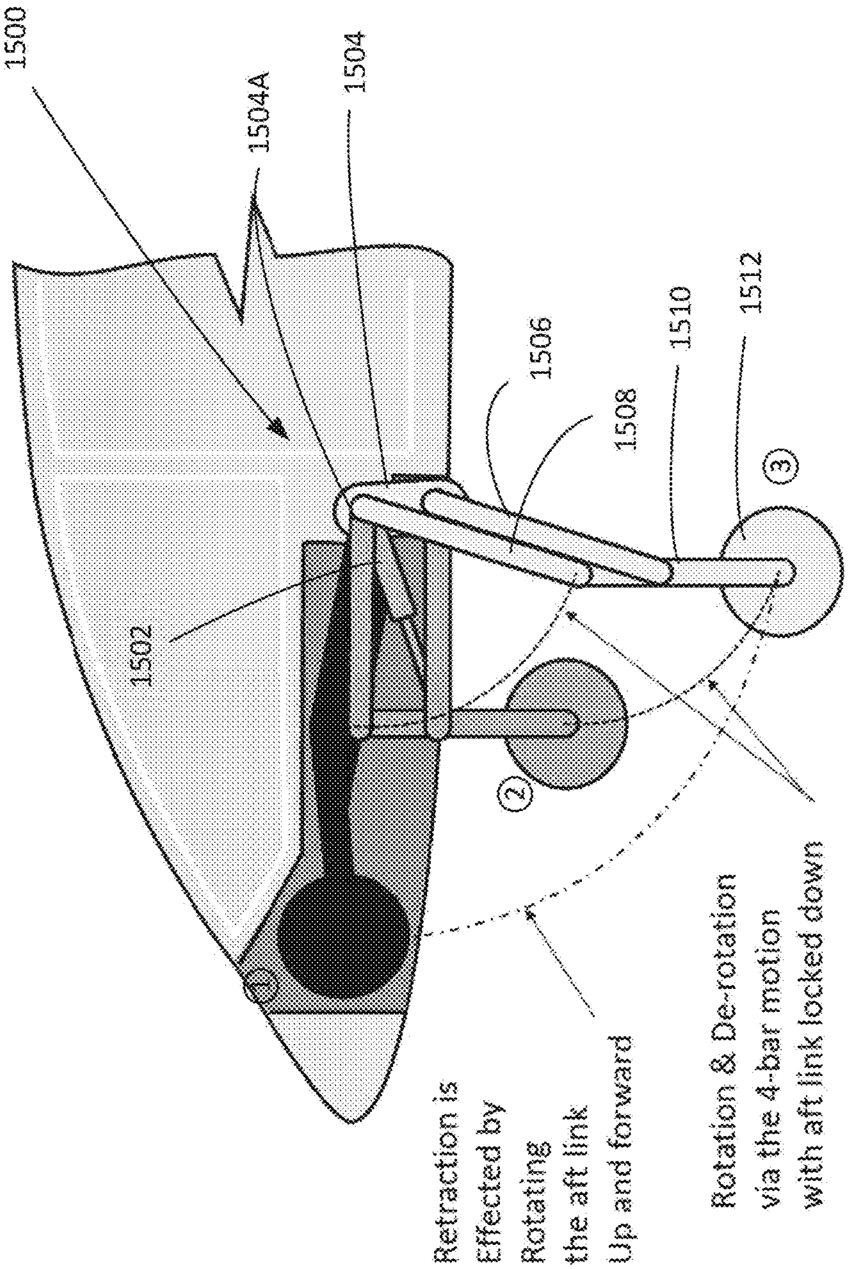
FIGS. 15-18 are side views of a swing-arm pivot-piston, in accordance with some examples of the present disclosure.
Figure 16:
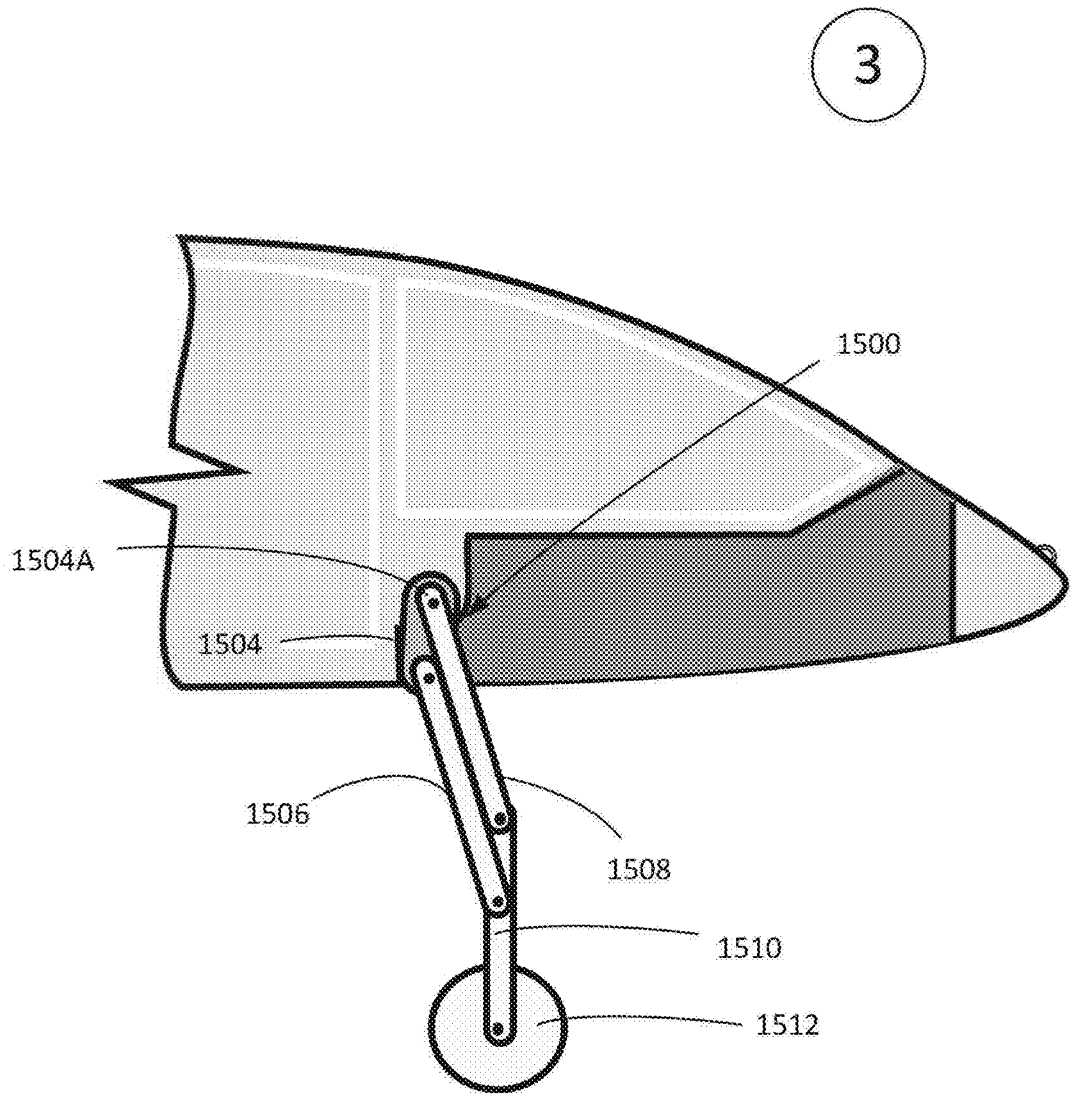
Figure 17:
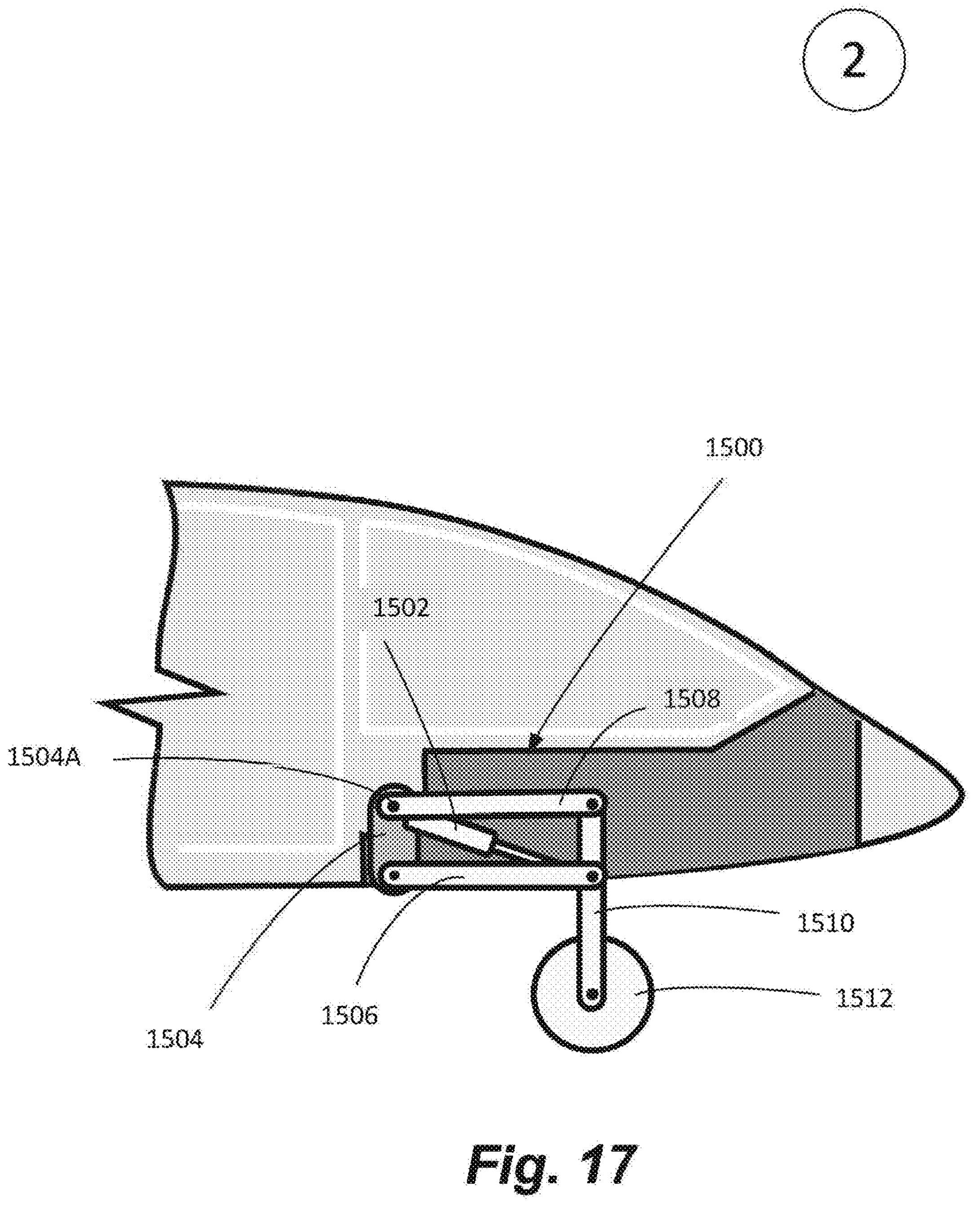
Figure 18:
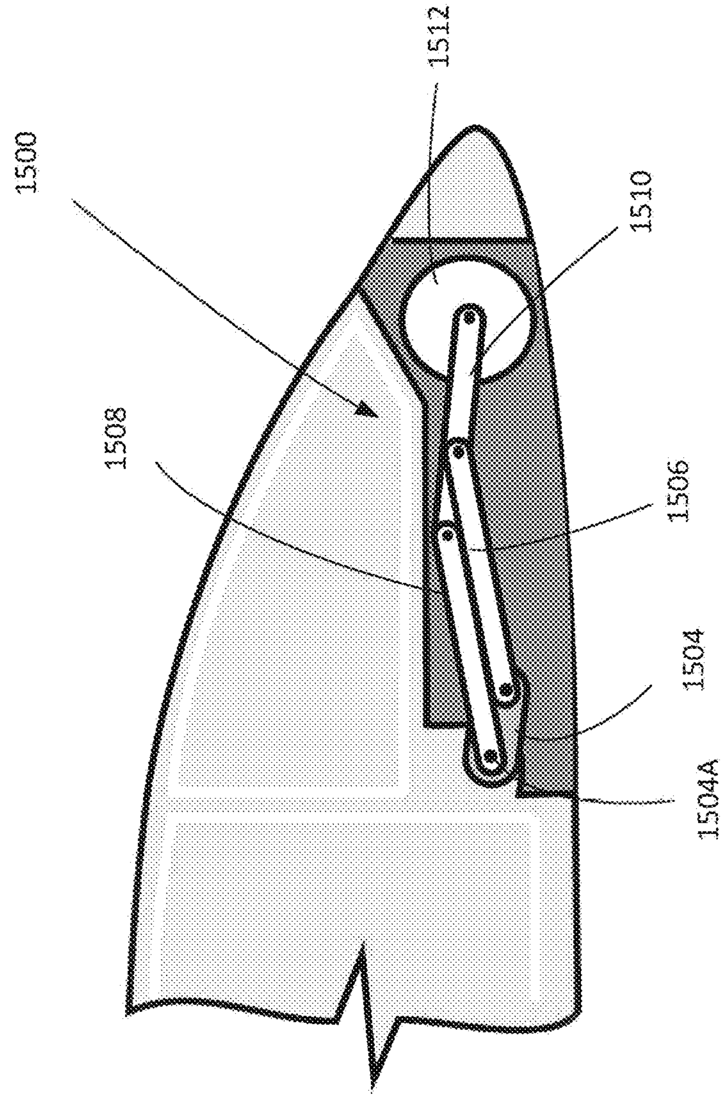

FIG. 14 is a side view of a trailing link pivot-piston nose gear 1400, in accordance with some examples of the present disclosure. The trailing link pivot-piston nose gear 1400 is disposed proximate to a front of an aircraft 1402. The trailing link pivot-piston nose gear 1400 incorporates a trailing link 1404 supported by a pivot-piston 1406 with integral shock absorbing. The pivot-piston 1406 is configured to extend and retract using various technologies such as hydraulics, air, magnetic or other technologies. The trailing link 1404 is horizontal (position 2) when the plane is level to the ground and nearly vertical for takeoff rotation (position 3) during take-off to achieve an optimal or takeoff pitch angle position. The trailing link pivot-piston nose gear 1400 is in position 2 when retracted into the aircraft after takeoff.

To move the trailing link pivot-piston nose gear 1400 from position 2 (the ground, taxiing, or pre-takeoff position), the pivot-piston 1406 extends from the length illustrated in position 2 to the length illustrated in position 3. The extension of the pivot-piston 1406 causes the trailing link 1404 to rotate about rotation point X. The placement of the trailing link pivot- piston nose gear 1400 into position 2, in conjunction with the operations of the main gear, as described in FIGS. 1-13 hereinabove, rotates the aircraft 1402 into a takeoff pitch angle position. After takeoff, to place the trailing link pivot-piston nose gear 1400 into position 1, an upper master link 1408 extends, rotating the trailing link pivot-piston nose gear 1400 about rotation point Y, rotating the trailing link pivot-piston nose gear 1400 into the aircraft 1402. In some examples, the pivot-piston 1406 can be fully extended to cause the trailing link 1404 to be vertical or substantially vertical in relation to the ground. A mechanical mixer (not shown) can be used to linearize the stroke relationship between the trailing link pivot-piston nose gear 1400 and one or more main gears, such as the main gear 305. A simple steering approach allows steering to naturally change from skid angle steer when level to camber thrust steering when the strut is extended to vertical. When the trailing link is fully extended vertically, the upper master link rotates to retract the assembly forward for the nose-gear, and aft for the main- gear.

FIGS. 15-18 are side views of a landing gear 1500 with a 4-bar link driven using a pivot-piston 1502, in accordance with some examples of the present disclosure. Various aspects of the presently disclosed subject matter describe a parallelogram 4-bar link driven by the pivot-piston 1502. The landing gear 1500 includes, the pivot-piston 1502, an aft/retract link 1504, a lower link 1506, an upper link 1508, and a main strut/gear link 1510. The links are configured to maintain a parallelogram throughout the complete motion range. The aft/retract link 1504 rotates to help maintain the parallelogram configuration. The main strut/gear link 1510 is supported by the pairing of the lower link 1506 and the upper link 1508, helping to maintain a parallelogram or similar non-parallel 4-bar geometry. As illustrated, the configuration identified as "1" is the retracted position (illustrated in FIG. 18), the configuration identified as "2" is the ground position (illustrated in FIG. 17), and the configuration identified as "3" (illustrated in FIG. 16).

In both the Ground (FIG. 17) and Liftoff & Touchdown (FIG. 16) configurations, the aft/retract link 1504 is vertical. With the aft/retract link 1504 vertical, the main strut/gear link 1510 will also stay vertical for any extension or retraction of the pivot-piston 1502. Other link geometries with more links can also serve the same function. A bogey 1512 with braking, a shock absorber, and steering, may be mounted to the end of the main strut/gear link 1510. A mechanical mixer (not illustrated) may be used to linearize the stroke relationship between the nose and main gears. Since the main strut/gear link 1510 is vertical from position 3 (fully extended Lift-off & Touchdown configuration) to position 2 (Ground configuration), steering may be straight-forward and conventional.

In order to change from position 3 (fully extended Lift off & Touchdown configuration) to position 1 (Retracted configuration), the aft/retract link 1504 is rotated about its upper pivot point 1504A, and this rotates the entire 4-bar link system. The pivot-piston 1502 does not require that braking does not induce a pitch motion beyond normal weight transfer. An isolated swing-arm gear may cause vertical stroking under braking. If the lower link 1506 is mounted forward of its mount bulkhead, it may stroke-out under braking. If the lower link 1506 is mounted behind its mount bulkhead, it may stroke-in under braking. Since the lower link 1506 may have similar vertical ground reactions, and therefore similar braking, the front and rear gear can be mounted in the same direction to null this unwanted effect. An alternative approach may be to allow opposite facing mounts but inhibit braking action until nose-lowering is complete.

CONCLUSION

System and methods for mechanically rotating an aircraft about its CG are disclosed. The system can use a variety of actuators to lower the main landing gear and/or raise the nose landing gear to achieve a desired pitch angle for takeoff, landing, or other flight or ground regimes. The system can use a passive hydraulic system, an active hydraulic system, or electrical or pneumatic actuators, among other things. The system can enable the aircraft to rotate about the CG, to reduce the aerodynamic control forces required due to weights and balances, landing gear or wing placement, or other factors. The system can be used on blended wing, delta wing, tube and wing, and other aircraft configurations.

While several possible embodiments are disclosed above, embodiments of the present invention are not so limited. For instance, while several possible configurations of hydraulic cylinders, linear actuators, valves, and motors, other suitable actuators and controls could be selected without departing from the spirit of embodiments of the invention. In addition, the location and configuration used for various features of embodiments of the present disclosure can be varied according to a particular aircraft, airport, or landing gear design that requires a slight variation due to, for example, size or weight constraints, runway length, aircraft type, or other factors. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. An aircraft with a landing gear system, comprising:

a nose gear, wherein the nose gear comprises:

a trailing link attached to a wheel of the aircraft at a first position wherein the trailing link is retracted into the aircraft;

a pivot piston configured to support the trailing link; and an upper master link configured to rotate the trailing link around a point of rotation to rotate the nose gear between a plurality of positions; and a plurality of main gears connected to the nose gear, wherein the aircraft is operable between:

a neutral lift configuration, in which the nose gear is in a second position wherein the trailing link is parallel to a ground surface and wherein the aircraft has a neutral pitch; and a positive lift configuration, in which the nose gear is in a third position wherein the trailing link is in an extended position for takeoff and wherein the aircraft has a positive pitch.

2. The aircraft of claim 1, wherein at least one of the plurality of main gears is located aft of a center of gravity of the aircraft.

3. The aircraft of claim 1, wherein the aircraft comprises a positive pitch angle during takeoff.

4. The aircraft of claim 1, wherein the nose gear is mounted on a rear swinging swingarm.

5. The aircraft of claim 4, wherein:

in a first position, the nose gear is fully retracted inside a fuselage of the aircraft.

6. The aircraft of claim 1, wherein, in the pitch angle position, a nose of the aircraft is raised relative to the ground position.

7. The aircraft of claim 1, wherein the pitch angle position is configured for landing of the aircraft.

8. The aircraft of claim 1, wherein the aircraft comprises a blended wing body aircraft.

9. The aircraft of claim 1, the aircraft further comprising at least one propulsor situated on an upper aft surface of the aircraft.

10. The aircraft of claim 1, further comprising a controller configured to communicatively couple the plurality of main gears to the nose gear.

11. The aircraft of claim 1, wherein the aircraft is configured to transition between the positive lift configuration and the neutral lift configuration while traversing the ground surface.

12. A method of use for an aircraft with a landing gear system, wherein the method comprises:

determining that the aircraft has reached a predetermined speed; and responsive to determining that the aircraft has reached the predetermined speed, transitioning the aircraft to a positive lift configuration by controlling a nose gear of the aircraft to rotate a trailing link of the nose gear supported by a pivot piston, using an upper master link, around a point of rotation between each of a plurality of positions in an operational sequence performed during continuous motion of the aircraft, wherein the plurality of positions comprises:

a first position wherein the trailing link is retracted into the aircraft;

a second position wherein the trailing link is parallel to a ground surface while the aircraft is in a neutral lift configuration; and a third position wherein the trailing link is in an extended position while the aircraft is in a the positive lift configuration for takeoff; and wherein the nose gear is connected to a plurality of main gears.

13. The method of claim 12, wherein at least one of the plurality of main gears is located aft of a center of gravity of the aircraft.

14. The method of claim 12, wherein the aircraft comprises a positive pitch angle during takeoff.

15. The method of claim 12, wherein the nose gear is mounted on a rear swinging swingarm.

16. The method of claim 12, wherein in a first position, the nose gear is fully retracted inside a fuselage of the aircraft.

17. The method of claim 12, wherein, in the pitch angle position, a nose of the aircraft is raised relative to the ground position.

18. The method of claim 12, wherein the pitch angle position is configured for landing of the aircraft.

19. The method of claim 12, wherein the aircraft comprises a blended wing body aircraft.

20. The method of claim 12, the aircraft further comprising at least one propulsor situated on an upper aft surface of the aircraft.

21. The method of claim 12, further comprising a controller configured to communicatively couple the plurality of main gears to the nose gear.

22. The method of claim 12, wherein the operational sequence comprises transitioning the aircraft from the neutral lift configuration to the positive lift configuration through actuation of the nose gear alone.

* * * * *